(12) United States Patent
Morikawa et al.

(10) Patent No.: US 10,133,522 B2
(45) Date of Patent: Nov. 20, 2018

(54) METHOD FOR GENERATING COLOR CORRESPONDENCE INFORMATION CAPABLE OF REDUCING CONSUMPTION AMOUNT OF COLORANT CONSUMED IN PRINTING

(71) Applicant: BROTHER KOGYO KABUSHIKI KAISHA, Nagoya, Aichi (JP)

(72) Inventors: Shota Morikawa, Nagoya (JP); Takuya Shimahashi, Nagoya (JP); Akidi Yoshida, Nagoya (JP); Kazuyuki Miyaki, Ichinomiya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/473,826

(22) Filed: Mar. 30, 2017

(65) Prior Publication Data
US 2017/0286024 A1    Oct. 5, 2017

(30) Foreign Application Priority Data

Mar. 30, 2016    (JP) .................................. 2016-069046

(51) Int. Cl.
*H04N 1/60* (2006.01)
*G06F 15/00* (2006.01)
(Continued)

(52) U.S. Cl.
CPC .......... *G06F 3/1219* (2013.01); *G06F 3/1229* (2013.01); *G06F 3/1244* (2013.01);
(Continued)

(58) Field of Classification Search
CPC .... G06F 3/1219; G06F 3/1229; G06F 3/1285; H04N 1/6058; H04N 2201/0094
See application file for complete search history.

(56) References Cited

U.S. PATENT DOCUMENTS

| 6,324,356 | B1 | 11/2001 | Inoue |
| 8,610,957 | B2* | 12/2013 | Hirano .................. H04N 1/6022 358/1.9 |
| 2003/0090686 | A1* | 5/2003 | Fujimori ............ H04N 1/40043 358/1.8 |

FOREIGN PATENT DOCUMENTS

| JP | H08-108548 A | 4/1996 |
| JP | 2001194855 A | 7/2001 |

(Continued)

*Primary Examiner* — Quang N Vo
(74) *Attorney, Agent, or Firm* — Scully, Scott, Murphy & Presser, PC

(57) ABSTRACT

A method includes generating color correspondence information correlating L number of first reference color specification values in a first color space with L number of determined second color specification values in a second color space on a one-to-one basis. The L number of determined second color specification values includes (L−Q) number of unmodified second reference color specification values, (Q−N) number of modified second reference color specification values modified in a first modification process but not in the second modification process, and N number of remodified second reference color specification values which are modified in both the first modification process and the second modification process, where L is an integer greater than or equal to two, Q is an integer greater than or equal to one and smaller than or equal to L, and N is an integer greater than or equal to one and smaller than or equal to Q.

6 Claims, 15 Drawing Sheets

(51) Int. Cl.
*G06K 1/00* (2006.01)
*G06F 3/12* (2006.01)
(52) U.S. Cl.
CPC .......... *G06F 3/1285* (2013.01); *H04N 1/605* (2013.01); *H04N 1/6058* (2013.01); *H04N 2201/0094* (2013.01)

(56) References Cited

FOREIGN PATENT DOCUMENTS

| | | | |
|---|---|---|---|
| JP | 2006123200 A | 5/2006 | |
| JP | 2007292871 A | 11/2007 | |
| JP | 2014162005 A | 9/2014 | |

\* cited by examiner

FIG. 4A

LUTs

| R | G | B | C | M | Y | K |
|---|---|---|---|---|---|---|
| 0 | 0 | 0 | 0 | 0 | 0 | 255 |
| 0 | 32 | 0 | 108 | 75 | 135 | 128 |
| 0 | 64 | 0 | 134 | 75 | 179 | 65 |
| : | : | : | : | : | : | : |
| 0 | 255 | 0 | 122 | 11 | 224 | 0 |
| 0 | 0 | 32 | 147 | 126 | 77 | 106 |
| 0 | 32 | 32 | 147 | 80 | 102 | 112 |
| : | : | : | : | : | : | : |
| 255 | 255 | 255 | 0 | 0 | 0 | 0 |

FIG. 4B

LUTc1 (C:−10)

| R | G | B | C | M | Y | K |
|---|---|---|---|---|---|---|
| 0 | 0 | 0 | 0 | 0 | 0 | 255 |
| 0 | 32 | 0 | 98(−10) | 75 | 135 | 128 |
| 0 | 64 | 0 | 124(−10) | 75 | 179 | 65 |
| : | : | : | : | : | : | : |
| 0 | 255 | 0 | 112(−10) | 11 | 224 | 0 |
| 0 | 0 | 32 | 137(−10) | 126 | 77 | 106 |
| 0 | 32 | 32 | 137(−10) | 80 | 102 | 112 |
| : | : | : | : | : | : | : |
| 255 | 255 | 255 | 0 | 0 | 0 | 0 |

FIG. 4C

LUTc2 (C:−20)

| R | G | B | C | M | Y | K |
|---|---|---|---|---|---|---|
| 0 | 0 | 0 | 0 | 0 | 0 | 255 |
| 0 | 32 | 0 | 88(−20) | 75 | 135 | 128 |
| 0 | 64 | 0 | 114(−20) | 75 | 179 | 65 |
| : | : | : | : | : | : | : |
| 0 | 255 | 0 | 102(−20) | 11 | 224 | 0 |
| 0 | 0 | 32 | 127(−20) | 126 | 77 | 106 |
| 0 | 32 | 32 | 127(−20) | 80 | 102 | 112 |
| : | : | : | : | : | : | : |
| 255 | 255 | 255 | 0 | 0 | 0 | 0 |

FIG. 4D

LUTm1y1 (M:−10, Y:−10)

| R | G | B | C | M | Y | K |
|---|---|---|---|---|---|---|
| 0 | 0 | 0 | 0 | 0 | 0 | 255 |
| 0 | 32 | 0 | 108 | 65(−10) | 125(−10) | 128 |
| 0 | 64 | 0 | 134 | 65(−10) | 169(−10) | 65 |
| : | : | : | : | : | : | : |
| 0 | 255 | 0 | 122 | 1(−10) | 214(−10) | 0 |
| 0 | 0 | 32 | 147 | 116(−10) | 67(−10) | 106 |
| 0 | 32 | 32 | 147 | 70(−10) | 92(−10) | 112 |
| : | : | : | : | : | : | : |
| 255 | 255 | 255 | 0 | 0 | 0 | 0 |

FIG. 5A

LUTs

| R | G | B | C | M | Y | K |
|---|---|---|---|---|---|---|
| 0 | 0 | 0 | 0 | 0 | 0 | 255 |
| 0 | 32 | 0 | 108 | 75 | 135 | 128 |
| 0 | 64 | 0 | 134 | 75 | 179 | 65 |
| .. | .. | .. | .. | .. | .. | .. |
| 0 | 255 | 0 | 122 | 6 | 224 | 0 |
| 0 | 0 | 32 | 147 | 126 | 77 | 106 |
| 0 | 32 | 32 | 147 | 80 | 102 | 112 |
| .. | .. | .. | .. | .. | .. | .. |
| 255 | 255 | 255 | 0 | 0 | 0 | 0 |

FIG. 5B

LUTc1

| C | M | Y | K |
|---|---|---|---|
| 0 | 0 | 0 | 255 |
| 98(−10) | 75 | 135 | 128 |
| 124(−10) | 75 | 179 | 65 |
| .. | .. | .. | .. |
| 112(−10) | 11 | 224 | 0 |
| 137(−10) | 126 | 77 | 106 |
| 137(−10) | 80 | 102 | 112 |
| 0 | 0 | 0 | 0 |

FIG. 5C

| Dc |
|---|
| 0 |
| 1 |
| 0.8 |
| .. |
| 0.9 |
| 1.1 |
| 1.2 |
| .. |
| 0 |

FIG. 5D

LUTc1z

| C | M | Y | K |
|---|---|---|---|
| 0 | 0 | 0 | 255 |
| 98(−10) | 75 | 135 | 128 |
| 122(−12) | 75 | 179 | 65 |
| .. | .. | .. | .. |
| 111(−11) | 11 | 224 | 0 |
| 138(−9) | 126 | 77 | 106 |
| 139(−8) | 80 | 102 | 112 |
| 0 | 0 | 0 | 0 |

FIG. 5E

| Dcz |
|---|
| 0 |
| 1 |
| 1 |
| .. |
| 1 |
| 1 |
| 1 |
| .. |
| 0 |

FIG. 11A

| LUTs | | | | | C | M | Y | K | L* | a* | b* | CH | | Rc |
|---|---|---|---|---|---|---|---|---|---|---|---|---|---|---|
| R | G | B | | | | | | | | | | | | |
| 0 | 0 | 0 | | | 0 | 0 | 0 | 255 | 0.112 | 0.067 | 0.052 | 0.084812 | | 0.02% |
| 0 | 32 | 0 | | | 108 | 75 | 135 | 128 | 14.906 | −13.23 | 8.811 | 15.89716 | | 2.85% |
| 0 | 64 | 0 | | | 134 | 75 | 179 | 65 | 26.83 | −23.95 | 16.504 | 29.08828 | | 5.21% |
| ... | | | | | | | | | | | | | | |
| 0 | 255 | 0 | | | 122 | 6 | 224 | 0 | 52.756 | −47.48 | 29.345 | 55.81308 | ← CHmax | 10.00% |
| 0 | 32 | 32 | | | 147 | 126 | 77 | 106 | 7.854 | 0.547 | −5.14 | 5.169024 | | 0.93% |
| 0 | 32 | 32 | | | 147 | 80 | 102 | 112 | 16.492 | −8.623 | −4.33 | 9.649095 | | 1.73% |
| ... | | | | | | | | | | | | | | |
| 255 | 255 | 255 | | | 0 | 0 | 0 | 0 | 99.999 | 0.01 | 0.001 | 0.01005 | | 0.00% |

FIG. 11B

| LUTx | | | | Cx | | | |
|---|---|---|---|---|---|---|---|
| R | G | B | | C | M | Y | K |
| 0 | 0 | 0 | | 0 | 0 | 0 | 255 |
| 0 | 32 | 0 | | 105 | 73 | 131 | 124 |
| 0 | 64 | 0 | | 127 | 71 | 170 | 62 |
| ... | | | | | | | |
| 0 | 255 | 0 | | 110 | 5 | 202 | 0 |
| 0 | 32 | 32 | | 146 | 125 | 76 | 105 |
| 0 | 32 | 32 | | 144 | 79 | 100 | 110 |
| ... | | | | | | | |
| 255 | 255 | 255 | | 0 | 0 | 0 | 0 |

FIG. 11C

| LUTcx | | | | Cx | | | |
|---|---|---|---|---|---|---|---|
| R | G | B | | C | M | Y | K |
| 0 | 0 | 0 | | 0 | 0 | 0 | 255 |
| 0 | 32 | 0 | | 105 | 75 | 135 | 128 |
| 0 | 64 | 0 | | 127 | 75 | 179 | 65 |
| ... | | | | | | | |
| 0 | 255 | 0 | | 110 | 6 | 224 | 0 |
| 0 | 32 | 32 | | 146 | 126 | 77 | 106 |
| 0 | 32 | 32 | | 144 | 80 | 102 | 112 |
| ... | | | | | | | |
| 255 | 255 | 255 | | 0 | 0 | 0 | 0 |

METHOD FOR GENERATING COLOR CORRESPONDENCE INFORMATION CAPABLE OF REDUCING CONSUMPTION AMOUNT OF COLORANT CONSUMED IN PRINTING

CROSS REFERENCE TO RELATED APPLICATION

This application claims priority from Japanese Patent Application No. 2016-069046 filed on Mar. 30, 2016. The entire content of the priority application is incorporated herein by reference.

TECHNICAL FIELD

The present disclosure relates to a method of processing data for printing.

BACKGROUND

Technologies have been proposed for generating data used for printing that can reduce the amount of colorants consumed in the printing operation. For example, there are techniques for reducing the consumption of colorants based on the residual amount of the colorants in the printer and the amount of colorants expected to be consumed when printing an image (see Japanese Patent Application Publication Nos. 2001-194855, 2007-292871, 2014-162005, and 2006-123200, for example).

SUMMARY

However, a new technology is needed for reducing the amount of colorants consumed in a printing process while suppressing an unnatural appearance of the printed colors.

In view of the foregoing, it is an object of the disclosure to provide a new technology for reducing the amount of colorant consumed in a printing process while suppressing an unnatural appearance of the printed colors.

In order to attain the above and other objects, the present disclosure provides a method for generating color correspondence information. The color correspondence information correlates a plurality of first color specification values in a first color space with a plurality of second color specification values in a second color space on a one-to-one basis. The color correspondence information is for printing using a plurality of types of colorants. The method includes: acquiring reference color correspondence information correlating L number of first reference color specification values in the first color space with L number of second reference color specification values in the second color space on a one-to-one basis, each of the L number of first reference color specification values including a plurality of first reference color components, each of the L number of second reference color specification values including a plurality of second reference color components, the plurality of second reference color components corresponding to respective ones of the plurality of types of colorants, where L is an integer greater than or equal to two; executing a first modification process to modify Q number of second reference color specification values among the L number of second reference color specification values to obtain Q number of modified second reference color specification values so as to reduce a consumption amount of at least one of the plurality of types of colorants consumed in printing, where Q is an integer greater than or equal to one and smaller than or equal to L; identifying a color difference index indicating color difference between each of the Q number of second reference color specification values and corresponding one of the Q number of second modified reference color specification values; executing a second modification process to remodify N number of modified second reference color specification values among the Q number of modified second reference color specification values to obtain N number of remodified second reference color specification values so that a color difference index indicating color difference between each of N number of second reference color specification values and corresponding one of the N number of remodified second reference color specification values approaches a target color difference index, where N is an integer greater than or equal to one and smaller than or equal to Q; and generating color correspondence information correlating the L number of first reference color specification values with L number of determined second color specification values on a one-to-one basis, the L number of determined second color specification values including (L−Q) number of second reference color specification values which are not modified in the first modification process nor in the second modification process, (Q−N) number of modified second reference color specification values which are modified in the first modification process but not in the second modification process, and the N number of remodified second reference color specification values which are modified in both the first modification process and the second modification process.

According to another aspect, the present disclosure provides a method for generating color correspondence information. The color correspondence information correlates a plurality of first color specification values in a first color space with a plurality of second color specification values in a second color space on a one-to-one basis. The color correspondence information is for printing using a plurality of types of colorants. The method includes: acquiring reference color correspondence information correlating L number of first reference color specification values in the first color space with L number of second reference color specification values in the second color space on a one-to-one basis, each of the L number of first reference color specification values including a plurality of first reference color components, each of the L number of second reference color specification values including a plurality of second reference color components, the plurality of second reference color components corresponding to respective ones of the plurality of types of colorants, where L is an integer greater than or equal to two; identifying a chroma index indicating a chroma of each of the L number of second reference color specification values; executing a modification process to modify Q number of second reference color specification values among the L number of second reference color specification values to obtain Q number of modified second reference color specification values so as to reduce a consumption amount of at least one of the plurality of types of colorants consumed in printing, the Q number of second reference color specification values including one second reference color specification value representing a first color and another second reference color specification value representing a second color, the first color having a first chroma index representing a first chroma, the second color having a second chroma index representing a second chroma lower than the first chroma, the first color and the second color being in a specific hue range, modification of the one second reference color specification value reducing the consumption amount with a first reduction rate, modification of the another second reference color specification value reducing the consumption amount with a second reduction rate smaller than the first reduction rate, where Q is an integer greater than or equal to one and smaller than or equal to L; and generating color correspondence information correlating the L number of first reference color specification values with L number of determined second color specification values on a one-to-one basis, the L number of determined second color specification values including (L−Q) number of second reference color specification values which are not modified in the modification process and the Q number of modified second reference color specification values which are modified in the modification process.

According to still another aspect, the present disclosure provides a method for generating color correspondence information. The color correspondence information correlates a plurality of first color specification values in a first color space with a plurality of second color specification values in a second color space on a one-to-one basis. The color correspondence information is for printing using a plurality of types of colorants. The method includes: acquiring reference color correspondence information correlating L number of first reference color specification values in the first color space with L number of second reference color specification values in the second color space on a one-to-one basis, each of the L number of first reference color specification values including a plurality of first reference color components, each of the L number of second reference color specification values including a plurality of second reference color components, the plurality of second reference color components corresponding to respective ones of the plurality of types of colorants, where L is an integer greater than or equal to two; identifying L number of ellipses corresponding to respective ones of the L number of second reference color specification values in a specific color space, differences in hues of a plurality of colors in each of the L number of ellipses being not easily recognizable; identifying a size index indicating a size of each of the L number of ellipses; executing a modification process to modify Q number of second reference color specification values among the L number of second reference color specification values to obtain Q number of modified second reference color specification values so as to reduce a consumption amount of at least one of the plurality of colorants consumed in the printing, the Q number of second reference color specification values including one second reference color specification value representing a first color and another second reference color specification value representing a second color, a first ellipse corresponding to the first color, the first ellipse having a first size index indicating a first size, a second ellipse corresponding to the second color, the second ellipse having a second size index indicating a second size smaller than the first size, the first color and the second color being in a specific hue range, modification of the one second reference color specification value reducing the consumption amount with a first reduction rate, modification of the another second reference color specification value reducing the consumption amount with a second reduction rate smaller than the first reduction rate, where Q is an integer greater than or equal to one and smaller than or equal to L; and generating color correspondence information correlating the L number of first reference color specification values and L number of determined second color specification values, the L number of determined second color specification values including (L−Q) number of second reference color specification values which are not modified in the modification process and the Q number of modified second reference color specification values which are modified in the modification process.

BRIEF DESCRIPTION OF THE DRAWINGS

The particular features and advantages of the disclosure as well as other objects will become apparent from the following description taken in connection with the accompanying drawings, in which:

FIG. 4A is a table showing an example of a reference look-up table as reference color correspondence information;

FIG. 4B is a table showing an example of an intermediate look-up table;

FIG. 4C is a table showing another example of the intermediate look-up table;

FIG. 4D is a table showing still another example of the intermediate look-up table;

FIG. 5A is an explanatory diagram showing an example of a reference look-up table;

FIG. 5B is an explanatory diagram showing CMYK color specification values in an intermediate look-up table corresponding to the reference look-up table shown in FIG. 5A;

FIG. 5C is an explanatory diagram showing an example of a color difference between two colors of same grid points given in FIGS. 5A and 5B;

FIG. 5D is an explanatory diagram showing CMYK color specification values in a reduction look-up table corresponding to the reference look-up table shown in FIG. 5A and the intermediate look-up table shown in FIG. 5B;

FIG. 5E is an explanatory diagram showing an example of a color difference between two colors of same grid points given in FIGS. 5A and 5D;

FIG. 11A is an explanatory diagram showing an example of a reference look-up table and sample calculations of reduction rates according to the fourth embodiment of the present disclosure;

FIG. 11B is an explanatory diagram showing an example of part of a modified gradation value table corresponding to the reference look-up table shown in FIG. 11A;

FIG. 11C is an explanatory diagram showing an example of part of a reduction look-up table corresponding to the reference look-up table shown in FIG. 11A and the modified gradation value table shown in FIG. 11B;

DETAILED DESCRIPTION

A. First Embodiment

Figure 1:
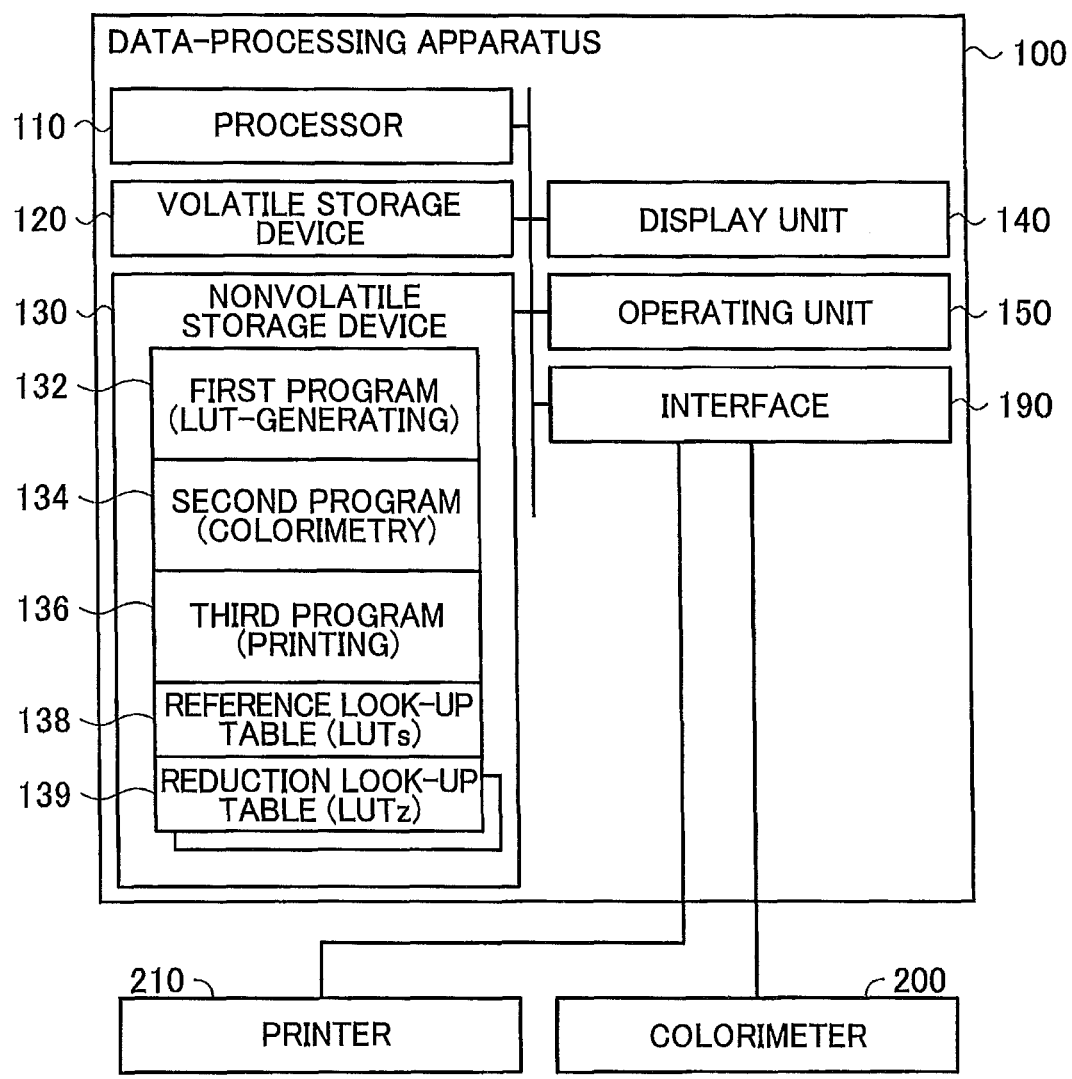
FIG. 1 is a block diagram showing a data-processing apparatus according to embodiments of the present disclosure.

FIG. 1 is a block diagram showing a data-processing apparatus 100 according to embodiments. The data-processing apparatus 100 is a personal computer, for example, such as a desktop computer or a tablet computer. The data-processing apparatus 100 includes a processor 110, a volatile storage device 120, a nonvolatile storage device 130, a display unit 140, an operating unit 150, and an interface 190. All of these components are interconnected via a bus.

The processor 110 is a central processing unit (CPU) or other device for processing data. The volatile storage device 120 is configured of a dynamic random access memory (DRAM), for example, while the nonvolatile storage device 130 is configured of a flash memory, for example.

The nonvolatile storage device 130 stores a first program 132, a second program 134, and a third program 136. By executing these programs 132, 134, and 136, the processor 110 implements various functions. The functions implemented by the programs 132, 134, and 136 will be described later in detail. The processor 110 temporarily stores various intermediate data used for executing the programs 132, 134, and 136 in a storage device (the volatile storage device 120 or nonvolatile storage device 130, for example).

The nonvolatile storage device 130 also stores reference color correspondence information 138. As will be described later, the reference color correspondence information 138 in the present embodiment is a look-up table correlating RGB color specification values with CMYK color specification values. The reference color correspondence information 138 is a predetermined look-up table that serves as a reference for newly generated color correspondence information (described later in detail). Hereinafter, the reference color correspondence information 138 will be also called the reference look-up table LUTs.

The display unit 140 is a liquid crystal display, for example, that serves to display images. The operating unit 150 is a device that accepts user operations, such as a touchscreen placed over the display unit 140. Through making operations on the operating unit 150, various instructions can be inputted into the data-processing apparatus 100.

The interface 190 is an interface for communicating with other devices. For example, the interface 190 may be a USB interface, a wired LAN interface, or a wireless communication interface conforming to the IEEE 802.11 standard. A colorimeter 200 and a printer 210 are connected to the interface 190. The colorimeter 200 is a spectrophotometer, for example, that functions to measure colors and to output colorimetric values. The printer 210 is a device that prints images on paper (an example of the printing medium). In the present embodiment, the printer 210 is an inkjet printing device that uses ink in the colors cyan (C), magenta (M), yellow (Y), and black (K). Note that a printing device of another type (a laser printer, for example) may be employed as the printer 210. The printer 210 is an example of the printer for performing printing operations.

Figure 2:
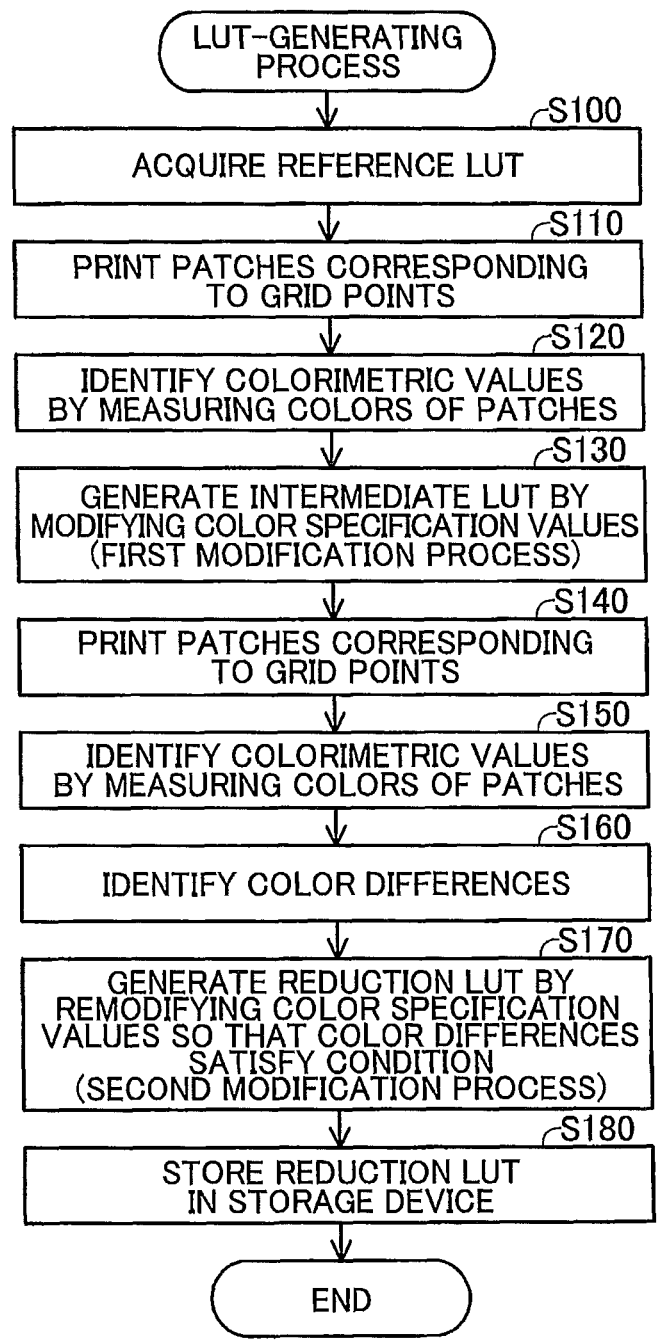
FIG. 2 is a flowchart illustrating steps in a process for generating look-up tables according to a first embodiment of the present disclosure.

FIG. 2 is a flowchart illustrating steps in a sample process for generating look-up tables for a printer. In the present embodiment, a look-up table is used to print an image based on image data expressed in the RGB color space. A look-up table LUT is a table specifying correlations between a plurality of color specification values expressed in gradation values for each of the RGB color components, and a plurality of color specification values expressed in gradation values for each of a plurality of color components corresponding to the plurality of colorants that the printer uses for printing. The printer 210 in the present embodiment can use four types of colorants having colors cyan C, magenta M, yellow Y, and black K, respectively. The gradation values for RGB and CMYK have 256 levels from 0 to 255. Each of the CMYK gradation values represents a quantity per unit area of the corresponding colorant. The RGB color specification values are examples of the first color specification values, and the CMYK color specification values are examples of the second color specification values. Hereinafter, the correspondences between RGB color specification values (first color specification values) and CMYK color specification values (second color specification values) will be called color correspondences.

Figure 3A:
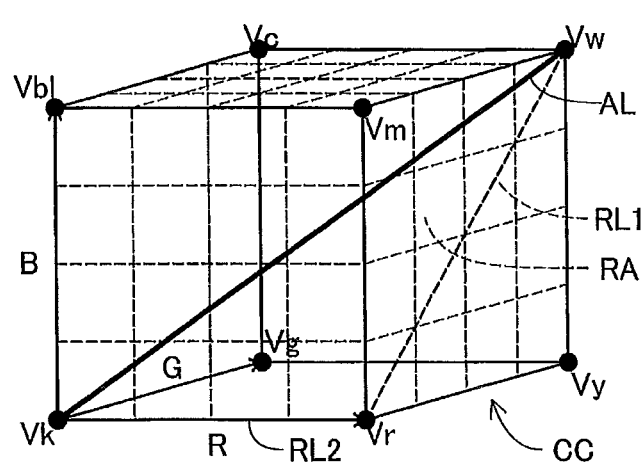
FIG. 3A is a schematic diagram of a color solid in a RGB color space.

FIG. 3A is a schematic diagram of a color solid CC expressed with RGB color components. Symbols are provided to indicate the color of each of the eight vertices in the color solid CC. Specifically, the color solid CC has a black vertex Vk (0, 0, 0), a red vertex Vr (255, 0, 0), a green vertex Vg (0, 255, 0), a blue vertex Vbl (0, 0, 255), a cyan vertex Vc (0, 255, 255), a magenta vertex Vm (255, 0, 255), a yellow vertex Vy (255, 255, 0), and a white vertex Vw (255, 255, 255). The numbers within the parentheses indicate the values of the color components (red R, green G, blue B).

In the present embodiment, the look-up table represents correspondences between a plurality of representative color specification values (also called "grid values") in the RGB color space and a plurality of color specification values in the CMYK color space that correspond to the plurality of grid values. For example, the grid values may be obtained by setting each of the RGB values to 33 specific values arranged at substantially equivalent intervals from 0 to 255 in the RGB color space. These plurality of grid values are distributed substantially uniformly throughout the color solid CC in FIG. 3A (not shown).

FIG. 3A also indicates a first line RL1, a second line RL2, and an achromatic line AL. The first line RL1 is a line segment connecting the white vertex Vw and red vertex Vr. The second line RL2 is a line segment connecting the red vertex Vr and black vertex Vk. Both lines RL1 and RL2 are on the outer surface of the color solid CC. The achromatic line AL is a line segment connecting the white vertex Vw and black vertex Vk. A relational expression R=G=B is satisfied at all points along the achromatic line AL. Color specification values along the achromatic line AL represent achromatic colors. Color specification values in a triangular-shaped area RA defined by the first line RL1, second line RL2, and achromatic line AL represent colors having a red hue. In general, the portion of any plane in the color solid CC that includes the achromatic line AL and that advances in one direction from the achromatic line AL has hues expressing substantially the same color. In other words, the direction from the achromatic line AL to a color point represents the hue at that color point. Further, the distance between the achromatic line AL and the color point in the color solid CC represents the saturation of the color point.

Figure 3B:
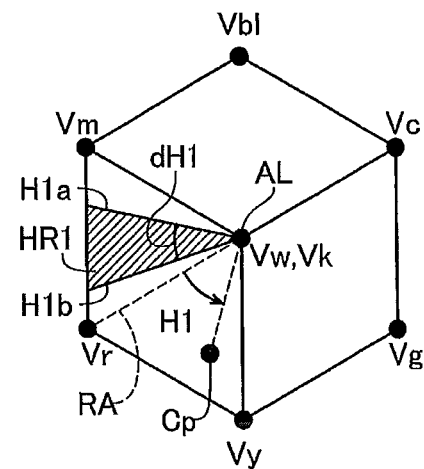
FIG. 3B is a schematic diagram of the color solid viewed along a direction parallel to an achromatic line AL shown in FIG. 3A.

FIG. 3B is a schematic diagram of the color solid CC viewed along a direction parallel to the achromatic line AL (and specifically, in the direction from the white vertex Vw toward the black vertex Vk). In FIG. 3B, the triangular-shaped area RA representing colors having a red hue is depicted by a dashed line segment connecting the white vertex Vw and red vertex Vr. A hue H1 of a color point Cp in the color solid CC is represented by an angle centered on the achromatic line AL, for example, going counterclockwise from a prescribed reference (the triangular-shaped area RA, for example) to the color point Cp. In the present embodiment, the hue H1 of the red vertex Vr is 0°; the hue H1 of the green vertex Vg is 120°; and the hue H1 of the blue vertex Vbl is 240°. A color range HR1 in the drawing is the range of hues H1 from a first hue H1$a$ to a second hue H1$b$. A width dH1 of hues H1 in the color range HR1 is equivalent to H1$b$−H1$a$. Hues in the color range HR1 are substantially equivalent when the width dH1 is small (30°, for example). Hereinafter, a color range HR1 whose width dH1 of hues H1 is 30° will be called a uniform hue range HR1. If a plurality of colors is observed in the uniform hue range HR1, differences in the hues of the plurality of colors are not easily recognizable.

Figure 3C:
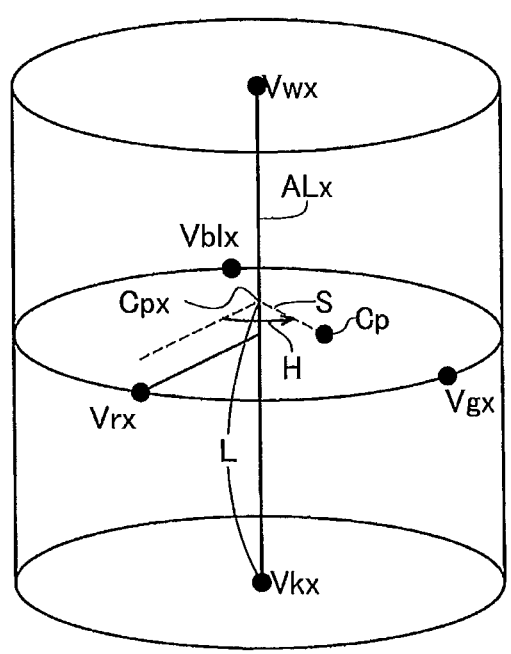
FIG. 3C is an explanatory diagram of a HSL color space.
Figure 3D:
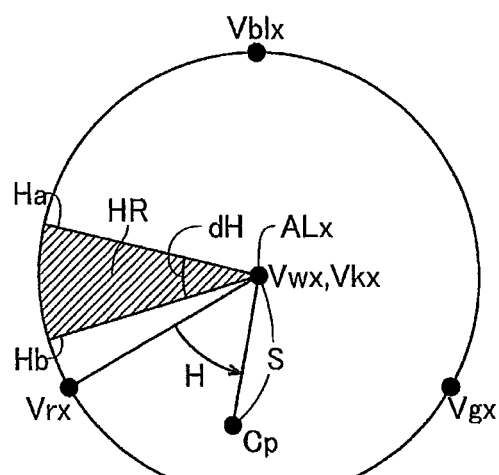
FIG. 3D is an explanatory diagram of the HSL color space viewed along a direction parallel to an achromatic line ALx shown in FIG. 3C.

FIG. 3C is an explanatory diagram of a HSL color space. The HSL color space is expressed by the three color components hue H, saturation S, and lightness L. The grid values described with reference to FIG. 3A are represented by color points in the HSL color space of FIG. 3C. The black vertex Vkx and white vertex Vwx in FIG. 3C respectively correspond to the black vertex Vk and white vertex Vw in FIG. 3A. A line ALx connecting the black vertex Vkx and white vertex Vwx represents achromatic colors and corresponds to the achromatic line AL in FIG. 3A (hereinafter called the "achromatic line ALx"). Similarly, a red vertex Vrx, a green vertex Vgx, and a blue vertex Vblx respectively correspond to the red vertex Vr, green vertex Vg, and blue vertex Vbl in FIG. 3A. FIG. 3D shows the HSL color space when viewed in a direction parallel to the achromatic line ALx (and specifically in the direction from the white vertex Vwx toward the black vertex Vkx).

The hue H, saturation S, and lightness L for the color point Cp are outlined in the drawings. As shown in FIG. 3D, the hue H is represented by an angle centered on the achromatic line ALx and rotating counterclockwise from a prescribed reference (the red vertex Vrx, for example) to the color point Cp (hence, a value from 0 to 360°). In the present embodiment, the hue H of the red vertex Vrx is 0°; the hue H of the green vertex Vgx is 120°; and the hue H of the blue vertex Vblx is 240°. As shown in FIGS. 3C and 3D, the saturation S is represented by a value that reflects the distance between the achromatic line ALx and the color point Cp. As shown in FIG. 3C, the lightness L is represented by the distance between a color point Cpx and the black vertex Vkx, where the color point Cpx is a point on the achromatic line ALx found by projecting the color point Cp onto the achromatic line ALx in a direction orthogonal to the same.

Here, the hue H is represented by a value in the range from 0 to 360, while the saturation S and lightness L are represented by values in a range from 0 to 255. The values of H, S, and L are expressed by the following equations based on RGB values.

$\max=\max(R,G,B)$, where $\max(R,G,B)$ denotes the largest of the $RGB$ values $\min=\min(R,G,B)$, where $\min(R,G,B)$ denotes the smallest of the $RGB$ values $L=(\max+\min)/2$ When $\max=R, H=60\times(G-B)/(\max-\min)$ When $\max=G, H=60\times(B-R)/(\max-\min)+120$ When $\max=B, H=60\times(R-G)/(\max-\min)+240$ When $L\leq(255/2), S=255\times(\max-\min)/(\max+\min)$ When $L>(255/2), S=255\times(\max-\min)/(2\times255-(\max+\min))$ A color range HR in FIG. 3D is the range of hues H from a first hue Ha to a second hue Hb. A width dH of hues H in the color range HR is equivalent to Hb−Ha. The hues in the color range HR are substantially equivalent when the width dH is small (30°, for example). Hereinafter, the color range HR will be called a uniform hue range HR when the width dH is 30°. When a plurality of colors is observed in the uniform hue range HR, differences among hues of the plurality of colors are not easily recognizable.

When the first hue Ha and second hue Hb in the HSL color space are respectively the same as the first hue H1$a$ and second hue H1$b$ in the RGB color space, the uniform hue range HR in the HSL color space represents substantially the same color as the uniform hue range HR1 in the RGB color space. However, not all regions in the HSL color space that correspond to planes in the RGB color space are themselves planes. Further, the hue H in the HSL color space corresponding to the hue H1 in the RGB color space does not always change linearly in response to changes in the hue H1. Consequently, a difference may arise between the uniform hue range HR1 and a color range in the RGB color space representing the same color as the uniform hue range HR in the HSL color space.

By executing the process in FIG. 2, the processor 110 (see FIG. 1) calculates a plurality of color specification values in the CMYK color space that correspond to a plurality of grid values in the RGB color space. The processor 110 executes the process in FIG. 2 according to the first program 132. The processor 110 also performs colorimetry using the colorimeter 200 according to the second program 134. The processor 110 also prints an image using the printer 210 according to the third program 136.

In S100 the processor 110 acquires a look-up table as a reference. In the present embodiment, the processor 110 acquires the reference color correspondence information 138 from the nonvolatile storage device 130. As described above, the reference correspondence information 138 is the reference look-up table LUTs that has been pre-calibrated to enable the printer 210 to print images in suitable colors.

FIG. 4A is a table showing an example of the reference look-up table LUTs as the reference color correspondence information 138. FIG. 4A shows just a portion of a table specifying color correspondences between RGB color specification values (grid values) and CMYK color specification values. One row represents a single color correspondence between RGB and CMYK values. Hereinafter, L will represent the total number of color correspondences represented by the reference look-up table LUTs (where L is an integer equal to or more than two). In other words, the reference look-up table LUTs includes L number of RGB color specification values and L number of CMYK color specification values.

In S110 of FIG. 2, the processor 110 controls the printer 210 according to the third (printing) program 136 to print a plurality of patches corresponding to the plurality of RGB grid values in the reference look-up table LUTs. One patch corresponds to a single grid value and is a region of uniform density represented by the CMYK color specification values associated with the grid value in the reference look-up table LUTs. Each of the patches corresponds to a different grid value (i.e., CMYK color specification values). In the following description, the RGB color specification values (i.e., the grid values) corresponding to the CMYK color specification values in the reference look-up table LUTs will be also called the "first reference color specification values," while the CMYK color specification values corresponding to the grid values in the reference look-up table LUTs will be also called the "second reference color specification values."

According to the third (printing) program 136, the processor 110 generates print data using patch image data representing the plurality of patches and supplies this print data to the printer 210. The printer 210 prints the plurality of patches according to the print data received from the processor 110. In the present embodiment, patch image data is expressed in the CMYK color space. Thus, the third (printing) program 136 instructs the processor 110 to execute a function for generating print data through a halftone process (an error diffusion process or a process using dither matrices, for example) incorporating CMYK gradation values. The patches are printed based on the print data generated in this halftone process. Note that the patch image data is prepared in advance. Alternatively, the processor 110 may generate the patch image data in S110 according to the first (LUT-generating) program 132.

In S120 the processor 110 controls the colorimeter 200 according to the second (colorimetry) program 134 to measure colors of the printed patches and to identify the colorimetric values of each patch. The colorimetric values are color specification values in a color space that is not dependent on the printer or other device. In the present embodiment, the colorimetric values are color specification values in the CIELAB color space (also called "Lab values"). This process serves to identify correspondences between the color specification values of the patches (CMYK values) and the colorimetric values (L*a*b* values).

In S130 the processor 110 modifies Q number of CMYK color specification values (where Q is an integer equal to or more than one and equal to or less than L) among the L number of CMYK color specification values in the reference look-up table LUTs to generate an intermediate look-up table (hereinafter called the "first modification process"). In the first modification process of the present embodiment, the processor 110 modifies the gradation values of some of the CMYK color components to smaller values in order to reduce the amount of at least one colorant consumed in printing. The processor 110 selects the correction amount from among a first correction amount and a second correction amount greater than the first correction amount. The first and second correction amounts are preferably set to avoid an excessive change in printed color resulting from correcting gradation values. As an example, the first correction amount may be set to 10 and the second correction amount to 20. The first correction amount is an example of the first amount, and the second correction amount is an example of the second amount.

FIGS. 4B through 4D show examples of the intermediate look-up tables. The intermediate look-up table LUTc1 in FIG. 4B reduces the gradation value for the cyan C component in each color correspondence of the reference look-up table LUTs by the first correction amount (10 in this case). The numbers in parentheses in the tables of FIGS. 4B through 4D denote the amount of change in the gradation value. In the example of FIG. 4B, the amount of change in the cyan C gradation values is −10 (i.e., the correction amount is 10). Note that when the original gradation value is zero, the gradation value is maintained at zero and not modified. Further, if the corrected gradation value is less than zero, the corrected gradation value is set to zero. The intermediate look-up table LUTc2 in FIG. 4C reduces the cyan C gradation value for each color correspondence in the reference look-up table LUTs by the second correction amount (20 in this example). The intermediate look-up table LUTm1y1 in FIG. 4D reduces both the magenta M and yellow Y gradation values in each color correspondence in the reference look-up table LUTs by the first correction amount.

In S130 of FIG. 2, the processor 110 generates five types of intermediate look-up tables by performing the following five types of first modification processes.

First type: The gradation value of one color component is reduced by the first correction amount.

Second type: The gradation value of one color component is reduced by the second correction amount.

Third type: The gradation values of two color components are reduced by the first correction amount.

Fourth type: The gradation values of two color components are reduced by the second correction amount.

Fifth type: The gradation value of one color component is reduced by the first correction amount, and the gradation value of another color component is reduced by the second correction amount.

Through the first and second types of first modification processes, the processor 110 generates an intermediate look-up table for each of the color components. That is, in the first type of modification process according to the first embodiment, the processor 110 generates a table in which cyan C has been modified, a table in which magenta M has been modified, a table in which yellow Y has been modified, and a table in which black K has been modified. The processor 110 similarly generates four intermediate look-up tables in the second type of first modification process.

In the third, fourth, and fifth types of first modification processes, the processor 110 generates an intermediate look-up table for each possible combination of two color components selected from the plurality of color components. Thus, in the third type of first modification process according to the present embodiment, the processor 110 generates six intermediate look-up tables corresponding to the six combinations C and M, C and Y, C and K, M and Y, M and K, and Y and K. Similarly, the processor 110 generates six intermediate look-up tables in the fourth type of first modification process. In the fifth type of first modification process, the processor 110 again generates six intermediate look-up tables for the six possible combinations of two color components by reducing one of the color components by the first correction amount and the other color component by the second correction amount. In addition, the processor 110 generates a further six intermediate look-up tables by switching the correction amounts between the two color components in each combination.

Thus, in S130 the processor 110 modifies some of the plurality of color components (and specifically one or two of the color components). When the original gradation value is zero, the processor 110 maintains the gradation value at zero without correction. Therefore, the total number Q of modified color correspondences among the L number of color correspondences in the reference look-up table LUTs may be less than L. In general, the total number Q of modified color correspondences is equal to or more than one and equal to or less than L.

Hereinafter, the symbol used for identifying each intermediate look-up table generated in S130 of FIG. 2 will be formed by appending characters indicating the modified color components (from among CMYK) and a number specifying the correction amount in the first modification process (where "1" indicates the first correction amount and "2" indicates the second correction amount) to the character string "LUT". For example, the symbol "LUTc1" for the intermediate look-up table in FIG. 4B indicates that the gradation values for cyan C were modified by the first correction amount. Similarly, "LUTm1y1" for the intermediate look-up table in FIG. 4D indicates that the gradation values for both magenta M and yellow Y were modified by the first correction amount.

In S140 of FIG. 2, the processor 110 prints patches for the plurality of color correspondences expressed in the intermediate look-up tables according to the third (printing) program 136. The patches printed in S140 are the plurality of patches for the plurality of color correspondences whose gradation values were corrected from among all color correspondences in all intermediate look-up tables generated in S130. The process for printing patches is performed in the same manner described in S110.

In S150 the processor 110 controls the colorimeter 200 according to the second (colorimetry) program 134 to measure the colors of the printed patches and to identify colorimetric values for each patch. The process of identifying colorimetric values is equivalent to that in S120.

In S160 the processor 110 identifies the color difference between each original patch and modified patch corresponding to the same grid points. The color difference is calculated using the colorimetric values identified in S120 and S150. In the present embodiment, the color difference is calculated by taking the square root of the sum of the square of the L* value, the square of the a* value, and the square of the b* value.

FIGS. 5A through 5C are explanatory diagrams showing an example of the reference look-up table LUTs, intermediate look-up table LUTc1, and a color difference Dc. FIG. 5A shows a portion of the reference look-up table LUTs. FIG. 5B indicates the CMYK color specification values for the portion of the intermediate look-up table LUTc1 corresponding to FIG. 5A. FIG. 5C indicates the color difference Dc between the two colors given in FIGS. 5A and 5B that correspond to the same grid value (and specifically, the color difference Dc between a patch for original CMYK color specification values and a patch for the modified CMYK color specification values that correspond to the same grid value). For example, the color difference Dc in the third row (R, G, B)=(0, 64, 0) indicates the color difference between the colorimetric values for the patch having (C, M, Y, K)=(134, 75, 179, 65) and the colorimetric values for the patch having (C, M, Y, K)=(124, 75, 179, 65). In FIG. 5C, color differences Dc greater than one are enclosed within a bold-lined box, while color differences Dc less than one are enclosed within a double-lined box.

In S170 of FIG. 2, the processor 110 generates final look-up tables by correcting the CMYK color specification values so that the color differences Dc satisfy a certain condition (hereinafter, this process will be called the second modification process). In the second modification process of the present embodiment, the processor 110 remodifies the CMYK color specification values such that the color differences Dc approach a predetermined target color difference.

FIG. 5D shows the CMYK color specification values in a look-up table LUTc1z remodified according to the second modification process. This look-up table LUTc1z is acquired by executing the second modification process on the intermediate look-up table LUTc1 in FIG. 5B. The character "z" appended at the end of symbol "LUTc1z" indicates that the second modification process was performed. (The character "z" is used for the same purpose hereinafter.) The portion of the look-up table shown in FIG. 5D corresponds to the portion in FIG. 5B. In FIG. 5D, cyan C gradation values for color correspondences whose color difference Dc is greater than the target color difference (one in this example) are enclosed in a bold-lined box, while cyan C gradation values for color correspondences whose color difference Dc is smaller than the target color difference are enclosed in a double-lined box.

The processor 110 calculates color specification values whose color difference Dc is equivalent to the target color difference using the original CMYK color specification values and the modified CMYK color specification values found in the first modification process of S130. The target color difference is predetermined. Note that the target color difference when the correction amount used in the first modification process is the second correction amount (20 in this case) is preferably greater than the target color difference when the correction amount used in the first modification process is the first correction amount (10 in this case). As an example, the target color difference may be set to "1" when the first correction amount is used and to "1.5" when the second correction amount is used.

The processor 110 calculates color specification values for achieving the target color difference through linear interpolation or linear extrapolation using original reference color specification values (original CMYK color specification values) and modified reference color specification values (modified CMYK color specification values), for example. The processor 110 then remodifies the gradation values in the intermediate look-up tables for the CMYK color components that were modified in S130 to gradation values capable of producing the target color difference. In the example of FIG. 5D, the correction amount for cyan C gradation values whose Dc>1 (bold-lined boxes) is modified to a value having an absolute value smaller than 10, and the correction amount for cyan C gradation values whose Dc<1 (double-lined boxes) is modified to a value having an absolute value greater than 10. Cyan C gradation values whose Dc=1 are not remodified. Note that color components not modified in S130 are not modified in S170 in the present embodiment. Further, gradation values not modified in S130 are not modified in S170, even for color components that were targeted for modification in S130. For example, a gradation value whose original value was zero is maintained at zero. Thus, gradation values modified in S170 are gradation values that were modified in S130. The total number N of CMYK color specification values remodified in S170 (i.e., color correspondences modified in S170) is equal to or more than zero and equal to or less than Q.

FIG. 5E indicates a color difference Dcz between colors of the same grid points given in FIGS. 5A and 5D. In the example of FIG. 5E, the color difference Dcz is changed to "1" for color correspondences whose cyan C gradation values were modified. Note that the steps for printing patches having the remodified color specification values and for identifying the color differences Dcz are omitted from the process shown in FIG. 2. Since the remodified color specification values are identified through calculations such as interpolation or extrapolation, the actual color difference Dcz may diverge from the target color difference. However, the color difference approaches the target color difference through this remodification, as described above.

Intermediate look-up tables in which color components other than cyan C have been modified are remodified in the same manner. Further, intermediate look-up tables in which two color components have been modified are similarly processed to remodify the gradation values of the two modified color components.

In S180 of FIG. 2, the processor 110 stores the look-up tables modified in the second modification process of S170 in a storage device, such as the nonvolatile storage device 130, as final look-up tables. Thereafter, the process of FIG. 2 ends. A single final look-up table is generated from each intermediate look-up table. Since a plurality of intermediate look-up tables is generated in the present embodiment as described above, a plurality of final look-up tables is also generated. Note that the final look-up tables have been modified such that the gradation values of one or two color components require a smaller colorant amount than the corresponding gradation values in the reference look-up table LUTs. Thus, use of the final look-up tables can reduce the consumption of colorants corresponding to those color components whose gradation values were modified in comparison to use of the reference look-up table LUTs. Hereinafter, the final look-up tables will also be called "reduction look-up tables LUTz" collectively. Further, the symbol for each reduction look-up table is formed by appending the character "z" to the symbol for the original intermediate look-up table. For example, the reduction look-up table LUTc1z in FIG. 5D is the look-up table generated by performing the second modification process (S170 of FIG. 2) on the intermediate look-up table LUTc1. The plurality of reduction look-up tables LUTz generated in the process of FIG. 2 is indicated by reference numeral 139 in FIG. 1. The reduction look-up table LUTz is an example of the color correspondence information.

Figure 6:
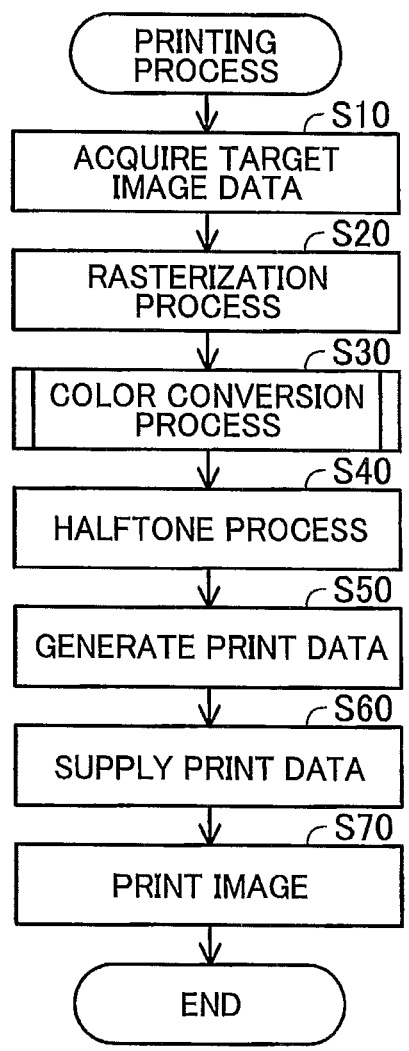
FIG. 6 is a flowchart illustrating steps in a printing process according to the embodiments of the present disclosure.

FIG. 6 is a flowchart illustrating steps in a sample printing process. The processor 110 executes this printing process using the reduction look-up tables LUTz created according to the procedure in FIG. 2. The following description will assume that the processor 110 executes the process in FIG. 6 according to the third (printing) program 136 (see FIG. 1). It will also be assumed that a plurality of the reduction look-up tables (LUTz) 139 generated in the process of FIG. 2 has been stored in the nonvolatile storage device 130, as shown in FIG. 1.

In S10 of FIG. 6, the processor 110 acquires a print command through user operation on the operating unit 150. A print command includes an instruction specifying target image data representing the image to be printed. The processor 110 acquires target image data specified by the user. For example, the processor 110 acquires the target image data from a storage device, such as the nonvolatile storage device 130. The target image data may be image data described in a page description language or image data compressed in the JPEG format, for example.

In S20 the processor 110 executes a rasterization process on the target image data acquired in S10 to generate bitmap data for the printing process. The bitmap data represents a target image that includes a plurality of pixels. In the present embodiment, the bitmap data is RGB image data expressing a color for each pixel using RGB gradation values. When the target image data is bitmap data, the processor 110 may execute a process for converting the resolution of the bitmap data (i.e., the pixel density) to a resolution suitable for the printing process.

In S30 the processor 110 executes a color conversion process on the RGB image data to generate image data corresponding to the types of colorant that can be used for printing. In the present embodiment, the processor 110 generates CMYK image data. The color conversion process is performed using the reduction look-up tables LUTz described above that establish correspondences between the RGB gradation values and CMYK gradation values (described later in greater detail).

In S40 the processor 110 executes a halftone process on the CMYK gradation values to generate dot data representing a dot formation state for each pixel and each type of ink. In the present embodiment, the halftone process employs an error diffusion process using error matrices. However, a halftone process using dither matrices may be employed instead.

In S50 the processor 110 generates print data using the dot data generated in S40. Print data is expressed in a data format that the printer 210 can interpret. For example, the processor 110 generates print data by arranging the dot data in the sequence used for printing and adding various printer control codes and data identification codes.

In S60 the processor 110 supplies the print data generated in S50 to the printer 210. In S70 the printer 210 prints an image based on the print data received in S60, thereby completing the printing process of FIG. 6.

Figure 7:
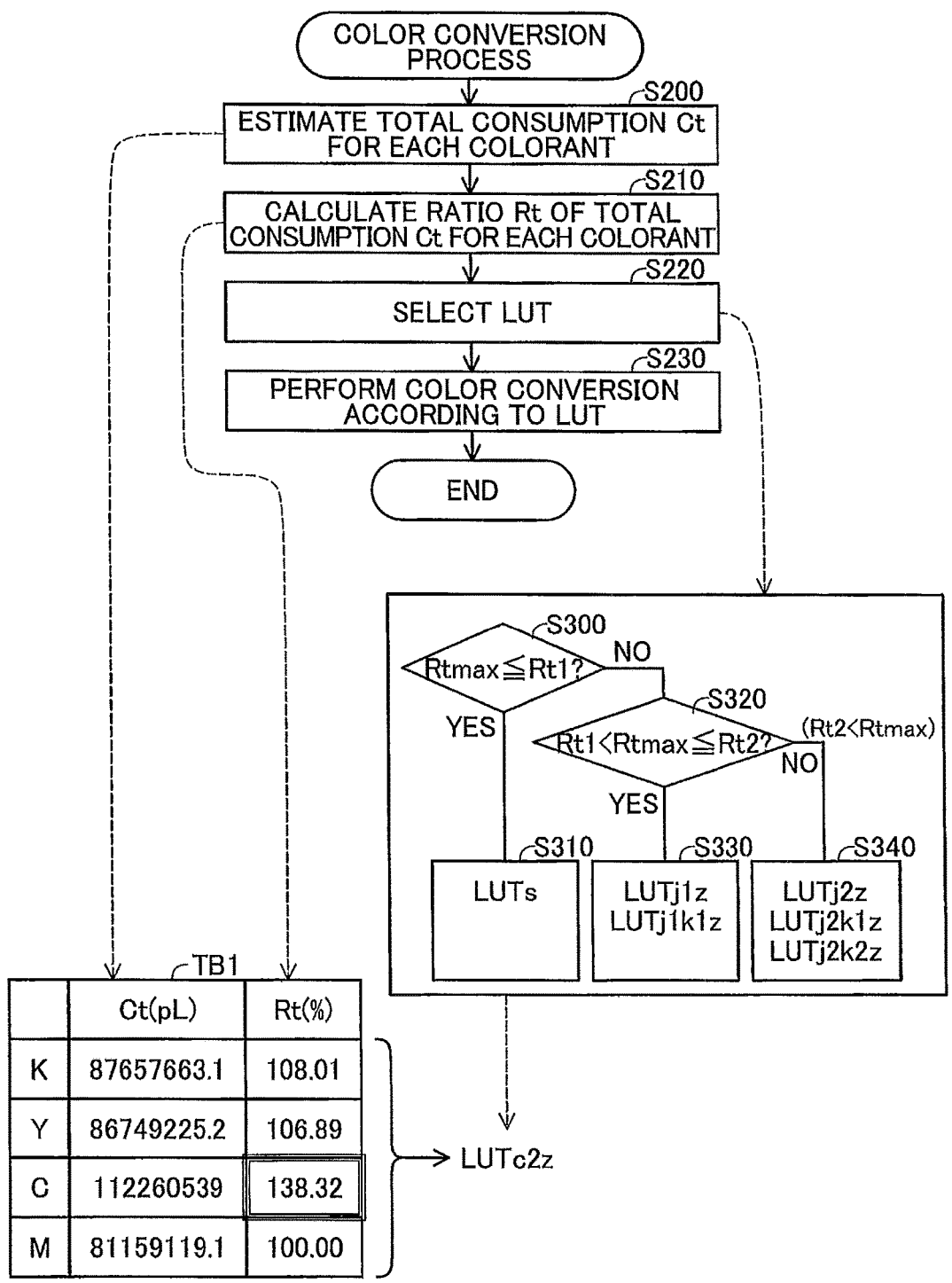
FIG. 7 is a flowchart illustrating steps in a color conversion process according to the first embodiment of the present disclosure.

FIG. 7 is a flowchart illustrating steps in a sample color conversion process. In S200 the processor 110 estimates a total consumption Ct for each colorant according to the reference look-up table LUTs being used for printing the target image. In the present embodiment, the processor 110 generates print data according to the procedure in FIG. 6, calculates the total number of dots for each of the CMYK colors by analyzing the print data, and calculates the total consumption Ct for each colorant by multiplying a colorant amount for one dot by the total number of dots. When dots of different sizes are used in printing, the colorant amount for one dot is multiplied by the total number of dots for each size, and the results of these multiplications for each size are added together to calculate the total consumption Ct. A table TB1 in FIG. 7 shows an example of the total consumption Ct for each of the CMYK colors (units: pL).

In S210 the processor 110 calculates a ratio Rt of the total consumption Ct for each colorant. The ratio Rt is a ratio based on the smallest total consumption Ct among the total consumptions Ct for the plurality of colorants. Since the total consumption Ct for magenta M is the smallest in the example of table TB1, the ratio Rt for each colorant indicates the ratio of the total consumption Ct in reference to the total consumption Ct of magenta M (units: %).

In S220 the processor 110 identifies the largest ratio Rtmax among the ratios Rt for the colorants and selects color correspondence information (look-up table, in this case on the basis of the largest ratio Rtmax. An example of more detailed steps for S220 is given below the flowchart in FIG. 7. In S300 the processor 110 determines whether the condition of the largest ratio Rtmax being less than or equal to a first threshold Rt1 is met. The first threshold Rt1 is a predetermined threshold value for determining when the largest ratio Rtmax is sufficiently small and is set to 110% in this example. If the largest ratio Rtmax is less than or equal to the first threshold Rt1 (S300: YES), in S310 the processor 110 selects the reference look-up table LUTs and ends step S220.

If the largest ratio Rtmax is greater than the first threshold Rt1 (S300: NO), in S320 the processor 110 determines whether the condition that the largest ratio Rtmax be greater than the first threshold Rt1 and less than or equal to a second threshold Rt2 is met. The second threshold Rt2 is a predetermined threshold values for determining if the largest ratio Rtmax is large and is set greater than the first threshold Rt1. In this example, the second threshold Rt2 is set to 120%. If the processor 110 reaches an affirmative determination in S320, in S330 the processor 110 selects a reduction look-up table in which the gradation values for one or two components whose ratio Rt exceeds the first threshold Rt1 were modified by the first correction amount in the first modification process, and subsequently ends step S220.

The box for S330 in FIG. 7 specifies the symbols for all reduction look-up tables that can be selected. The symbol "LUTj1z" indicates that the processor 110 can select a reduction look-up table in which the gradation values of color component j have been modified by the first correction amount. Similarly, the symbol "LUTj1k1z" indicates that the processor 110 can select a reduction look-up table in which the gradation values of color component j have been modified by the first correction amount and the gradation values of color component k have also been modified by the first correction amount. In the present embodiment, the processor 110 selects the reduction look-up table LUTj1z when the ratio Rt for one color component j exceeds the first threshold Rt1, and selects the reduction look-up table LUTj1k1z for the color component j having the largest ratio Rt and the color component k having the second largest ratio Rt when the ratio Rt for two or more color components exceeds the first threshold Rt1.

If the processor 110 reaches a negative determination in S320, i.e., if the largest ratio Rtmax is greater than the second threshold Rt2 (S320: NO), in S340 the processor 110 selects a reduction look-up table in which the gradation values of color components whose ratio Rt is greater than the second threshold Rt2 have been modified by the second correction amount and the gradation values of color components whose ratio Rt is greater than the first threshold Rt1 but less than or equal to the second threshold Rt2 have been modified by the first correction amount, and subsequently ends step S220.

The box for S340 in FIG. 7 specifies symbols for all reduction look-up tables that the processor 110 can select. The symbol "LUTj2z" indicates that the processor 110 can select a reduction look-up table in which the gradation values of color component j have been modified by the second correction amount. Similarly, the symbol "LUTj2k1z" indicates that the processor 110 can select a reduction look-up table in which the gradation values of color component j have been modified by the second correction amount and the gradation values of color component k have been modified by the first correction amount. The symbol "LUTj2k2z" indicates that the processor 110 can select a reduction look-up table in which the gradation values for the color component j have been modified by the second correction amount and the gradation values for the color component k have also been modified by the second correction amount. In the present embodiment, the processor 110 selects the reduction look-up table LUTj2z when the ratio Rt for one color component j exceeds the second threshold Rt2 and the ratios Rt for the other color components are less than or equal to the first threshold Rt1. The processor 110 selects the reduction look-up table LUTj2k2z for the color component j having the largest ratio Rt and the color component k having the second largest ratio Rt when the ratio Rt for two or more color components exceeds the second threshold Rt2. The processor 110 selects the reduction look-up table LUTj2k1z for the color component j having the largest ratio Rt and the color component k having the largest ratio Rt among the one or more other color components when the ratio Rt for the color component j exceeds the second threshold Rt2 and the ratios Rt for the one or more other color components are greater than the first threshold Rt1 but less than or equal to the second threshold Rt2.

In the sample table TB1 of FIG. 7, the only color component whose ratio Rt exceeds the first threshold Rt1 is cyan C. Further, the ratio Rt for cyan C is also greater than the second threshold Rt2. Accordingly, the processor 110 selects the reduction look-up table LUTc2z, which modifies the gradation values for cyan C by the second correction amount, as the reduction look-up table.

After selecting a look-up table (a reference look-up table LUTs or a reduction look-up table LUTz) in S220, in S230 the processor 110 converts the RGB gradation values for each pixel in the target image to CMYK gradation values according to the look-up table selected in S220. Subsequently, the process of FIG. 7 ends.

In the first embodiment described above, the first modification process (S130 of FIG. 2) modifies Q number of the second reference color specification values (CMYK color specification values in this example) from among the L number of second reference color specification values in order to reduce the consumption amount of at least one colorant. Next, the second modification process (S170 of FIG. 2) remodifies N number of second reference color specification values from among the Q number of second reference color specification values modified in the first modification process so that the color difference Dc approaches the target color difference. The reduction look-up tables LUTz that are ultimately generated represent a plurality of correspondences, including L sets of correspondences between L number of first reference color specification values and L number of determined second reference color specification values. Here, the L number of determined second color specification values include (A) (L−Q) number of second reference color specification values that were not modified in the first modification process nor in the second modification process, (B) (Q−N) number of modified second reference color specification values that were modified in the first modification process but not in the second modification process, and (C) N number of remodified second reference color specification values that were modified in both the first and second modification processes. With this configuration, the first modification process of the first embodiment can reduce the consumption amounts of colorants used in printing. Further, the second modification process can suppress excessive changes in some colors caused by modifying the gradation values since the gradation values are remodified in order that the change in colors caused by modifying the gradation values approaches a target color difference. Thus, the second modification process can suppress an unnatural appearance of the printed colors.

As described in S130 of FIG. 2, the processor 110 generates a plurality of reduction look-up tables LUTz designed to achieve maximum reduction in consumption for different colorants. Here, the reduction in consumption is highest for a specific colorant when the difference between the amount of consumption per unit area for the specific colorant represented by the reference look-up table LUTs (the gradation values for a color component corresponding to a specific colorant and represented by the second reference color specification values in this case) and the amount of consumption per unit area of the specific colorant represented by the reduction look-up table LUTz is greater than the differences for other colorants.

For example, the processor 110 generates the reduction look-up table LUTc1z in which the second reference color specification values for cyan C have been modified to reduce the consumption amount of the cyan C colorant (the colorant amount consumed per unit area, for example) more than the other colorants, and a reduction look-up table LUTm1z (not shown) in which the second reference color specification values for magenta M have been modified to reduce the consumption amount of the magenta M colorant more than the other colorants. As described with reference to FIG. 7, a reduction look-up table modified so that the consumption amount of the specific colorant is reduced the most can be used when the total consumption amount of that colorant is the largest. For example, the reduction look-up table LUTc1z for cyan C can be used when the colorant having the highest ratio Rt of the total consumption Ct is cyan C. Similarly, the reduction look-up table LUTm1z for magenta M can be used when the colorant having the highest ratio Rt of the total consumption Ct is magenta M. This method can reduce the actual total consumption of a colorant that would have the highest total consumption when using the reference look-up table LUTs. Note that the reduction look-up table LUTc1z is an example of the first color correspondence information, and the reduction look-up table LUTm1z is an example of the second color correspondence information.

As described in S130 of FIG. 2, two reduction look-up tables LUTz having different correction amounts for gradation values are generated in order to reduce the consumption amount of the same colorant. For example, the processor 110 generates the reduction look-up table LUTc1z in which the cyan gradation values are modified by the first correction amount, and the reduction look-up table LUTc2z in which the cyan gradation values are modified by the second correction amount. When the look-up table LUTc1z is used, the consumption amount of the cyan C colorant is reduced by a first amount determined according to the first correction amount for the gradation value. When the reduction look-up table LUTc2z is used, the consumption amount of the cyan colorant is reduced by a second amount determined according to the second correction amount for the gradation values. Since the processor 110 generates a plurality of reduction look-up tables LUTz that reduce the consumption amount of the same colorant by different quantities, the present disclosure can perform color conversion that achieves different reduction amounts in the consumption of the same colorant. As described in the example of FIG. 7, colorant can be suitably conserved by using a reduction look-up table with a higher reduction amount when the total consumption Ct is higher.

B. Second Embodiment

Figure 8:
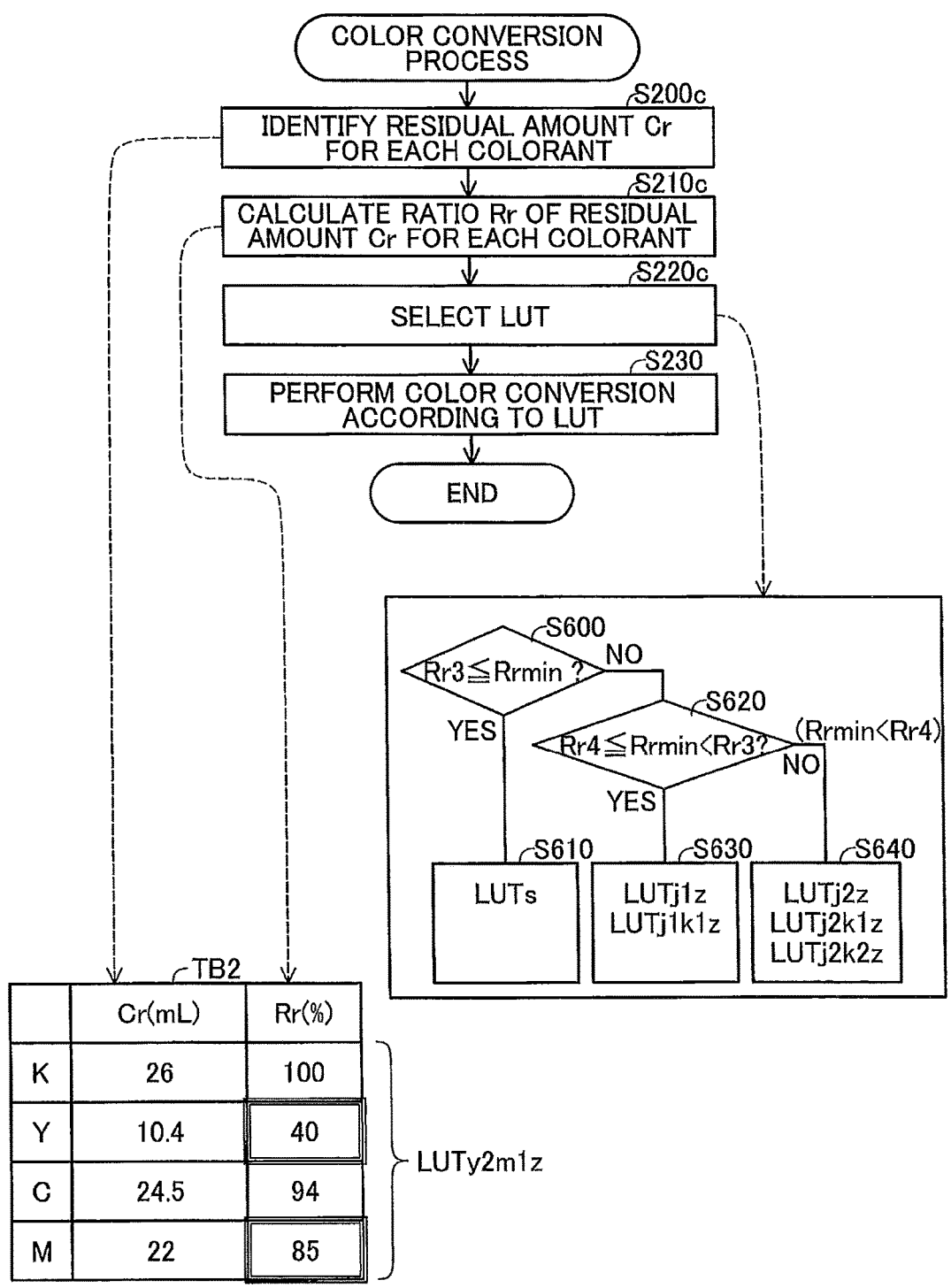
FIG. 8 is an explanatory diagram including a flowchart illustrating steps in a color conversion process according to a second embodiment of the present disclosure.

FIG. 8 is a flowchart illustrating steps in the color conversion process according to a second embodiment of the present disclosure. The color conversion process in FIG. 8 may be executed in place of the color conversion process in FIG. 7 and differs from the process in FIG. 7 by using a residual amount Cr in place of the total consumption Ct.

In S200c of FIG. 8, the processor 110 identifies the residual amount Cr for each colorant prior to printing the target image. In the second embodiment, the printer 210 (see FIG. 1) can output residual amount data representing the current residual amount for each colorant. The processor 110 issues a request for residual amount data to the printer 210, acquires the residual amount data from the printer 210, and uses this residual amount data to identify the residual amount Cr for each colorant. Table TB2 in FIG. 8 provides an example of residual amount Cr for each of the CMYK colors (units: mL). Any of various methods may be used to identify the residual amounts Cr. For example, the processor 110 may calculate a cumulative amount of total consumption Ct for each color from each printing operation executed after the previous colorant container (ink cartridge, for example) is replaced with a new container and may store the cumulative amount for each color in the nonvolatile storage device 130. Next, the processor 110 may calculate the residual amount Cr for each color by subtracting this cumulative amount from a predetermined amount of colorant accommodated in a new container.

In S210c the processor 110 calculates a ratio Rr of the residual amount Cr for each colorant. The ratio Rr is the ratio of the residual amount Cr of the colorant to the largest residual amount Cr among the plurality of colorants. Since the residual amount Cr for black K is largest in the example of table TB2, the ratio Rr for each colorant denotes the ratio of the residual amount Cr of that colorant to the residual amount Cr of black K (units: %).

In S220c the processor 110 selects a look-up table on the basis of the ratio Rr of each colorant. A detailed procedure for step S220c is given below the flowchart in FIG. 8. In S600 of this procedure, the processor 110 identifies a minimum ratio Rrmin among the ratios Rr for all color components, and determines whether the minimum ratio Rrmin is greater than or equal to a third threshold Rr3. The third threshold Rr3 is a predetermined threshold value for determining whether the minimum ratio Rrmin is sufficiently large and is set to 90% in this example. When the minimum ratio Rrmin is greater than or equal to the third threshold Rr3 (S600: YES), in S601 the processor 110 selects the gradation values in the reference look-up table LUTs, and subsequently ends the procedure for S220c.

When the minimum ratio Rrmin is smaller than the third threshold Rr3 (S600: NO), in S620 the processor 110 determines whether the minimum ratio Rrmin is greater than or equal to a fourth threshold Rr4. The fourth threshold Rr4 is a predetermined threshold value for determining whether the minimum ratio Rrmin is small and is set smaller than the third threshold Rr3. In this example, the fourth threshold Rr4 is set to 80%. If the processor 110 reaches an affirmative determination in S620, in S630 the processor 110 selects a reduction look-up table in which the gradation values for one or two color components whose ratio Rr is less than the third threshold Rr3 were modified by the first correction amount in the first modification process, and subsequently ends the procedure of S220c. The box for S630 in FIG. 8, like the box for S330 in FIG. 7, specifies the symbols for all reduction look-up tables that can be selected. The processor 110 selects the reduction look-up table LUTj1z when the ratio Rr for one color component j is less than the third threshold Rr3, and selects the reduction look-up table LUTj1k1z for the color component j having the smallest ratio Rr and the color component k having the second smallest ratio Rr when the ratio Rr for two or more color components is less than the third threshold Rr3.

However, If the processor 110 reaches a negative determination in S620, i.e., if the minimum ratio Rrmin is less than the fourth threshold Rr4 (S620: NO), in S640 the processor 110 selects a reduction look-up table in which the gradation values of color components corresponding to the colorants whose ratio Rr is smaller than the fourth threshold Rr4 are modified by the second correction amount and the gradation values for color components whose ratio Rr is greater than or equal to the fourth threshold Rr4 and less than the third threshold Rr3 are modified by the first correction amount, and subsequently ends the procedure for S220c. As with the box for S340 in FIG. 7, the box for S640 in FIG. 8 specifies the symbols for all reduction look-up tables that can be selected. The processor 110 selects the reduction look-up table LUTj2z when the ratio Rr for one color component j is less than the fourth threshold Rr4 and the ratios Rr for all other color components are greater than or equal to the third threshold Rr3. The processor 110 selects the reduction look-up table LUTj2k2z for the color component j having the smallest ratio Rr and the color component k having the second smallest ratio Rr when the ratios Rr for two or more color components are less than the fourth threshold Rr4. The processor 110 selects the reduction look-up table LUTj2k1z for the color component j having the smallest ratio Rr and the color component k having the smallest ratio Rr among the one or more other color components when the ratio Rr for the color component j is less than the fourth threshold Rr4 and the ratios Rr for the one or more other color components are smaller than the third threshold Rr3 but greater than or equal to the fourth threshold Rr4.

In the sample table TB2 of FIG. 8, only color components yellow Y and magenta M have a smaller ratio Rr than the third threshold Rr3 (90% in this example). Further, only the color component yellow Y has a smaller ratio Rr than the fourth threshold Rr4 (80% in this example). The ratio Rr for magenta M is greater than or equal to the fourth threshold Rr4 and less than the third threshold Rr3. Hence, in this case the processor 110 selects the reduction look-up table LUTy2m1z for modifying yellow Y gradation values by the second correction amount and for modifying magenta M gradation values by the first correction amount.

After selecting a look-up table (a reference look-up table LUTs or a reduction look-up table LUTz) in S220c, in S230 the processor 110 converts the RGB gradation values for each pixel representing the target image to CMYK gradation values according to the look-up table selected in S220c. Subsequently, the process of FIG. 8 ends.

In the second embodiment described above, the processor 110 generates a plurality of reduction look-up tables LUTz that differ in which colorant has the highest reduction in consumption amount through the process of FIG. 2. Thereafter, the processor 110 can use a reduction look-up table for modifying gradation values of a specific colorant in order that the consumption of the specific colorant is reduced most when the residual amount Cr of the specific colorant is smallest, as described with reference to FIG. 8. For example, the reduction look-up table LUTc1z for cyan C may be used when the ratio Rr for the residual amount Cr of cyan C is lowest. The reduction look-up table LUTm1z for magenta M may be used when the ratio Rr for the residual amount Cr of magenta M is lowest. Since this method reduces the consumption of the colorant whose residual amount Cr has the smallest ratio Rr, the present disclosure can prevent the difference in residual amounts Cr from becoming too great among the plurality of colorants. Here, the reduction look-up table LUTc1z is an example of the first color correspondence information, and the reduction look-up table LUTm1z is an example of the second color correspondence information.

As described in S130 of FIG. 2, the second embodiment generates a plurality of reduction look-up tables LUTz that reduce the consumption of the same colorant by different amounts, thereby achieving color conversion with different reduction amounts in consumption of the same colorant. For example, the processor 110 can suppress an increase in the differences among residual amounts Cr of the plurality of colorants by using a reduction look-up table LUTz having higher reduction amounts for smaller residual amounts Cr.

Note that when there are four or more colorants available, the ratios Rr of residual amounts Cr for three or more colorants could be less than the third threshold Rr3 or less than the fourth threshold Rr4. In this case, it is preferable that the processor 110 generates intermediate look-up tables in S130 of FIG. 2 that modify the gradation values of three or more color components and generates reduction look-up tables LUTz in S170 that modify the gradation values of three or more color components. Further, in S220c of FIG. 8, it is preferable that the processor 110 selects a reduction look-up table LUTz that modifies all color components having a ratio Rr that is less than the third threshold Rr3.

C. Third Embodiment

Figure 9:
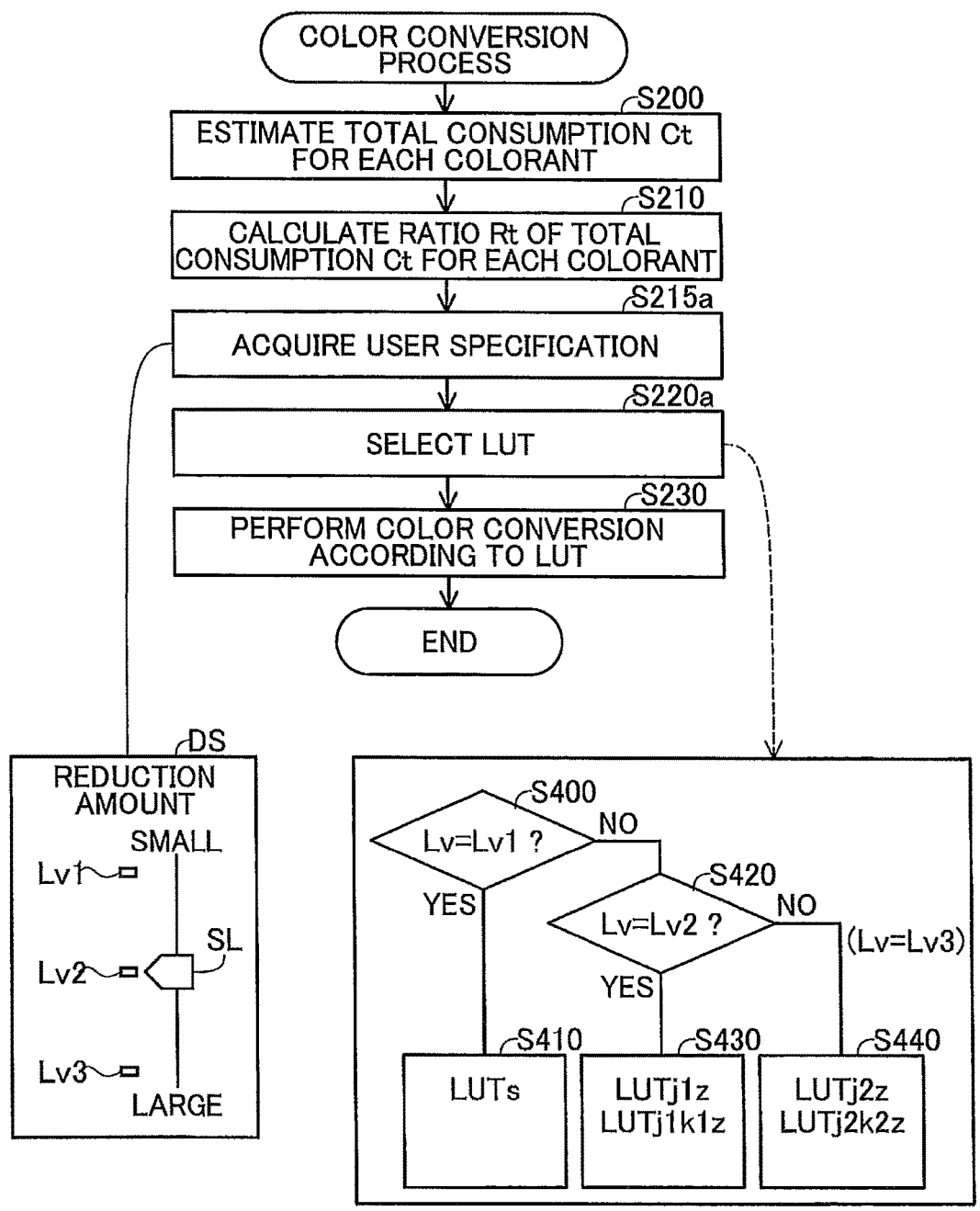
FIG. 9 is an explanatory diagram including a flowchart illustrating steps in a color conversion process according to a third embodiment of the present disclosure.

FIG. 9 is a flowchart illustrating steps in the color conversion process (S30 of FIG. 6) according to a third embodiment of the present disclosure. The third embodiment differs from the first embodiment described with reference to FIG. 7 in that the user selects the gradation value correction amounts, i.e., the amounts of reduction in the consumption of colorants. The processes in S200 and S210 of FIG. 9 are identical to those in FIG. 7. In S215a the processor 110 acquires a user specification for a reduction level. An example of an input screen DS displayed on the display unit 140 is given below the flowchart in FIG. 9. Through making operations on the operating unit 150 (FIG. 1), a user can move a slider SL in the input screen DS to one of three positions corresponding to "Lv1 (small)," "Lv2 (medium)," and "Lv3 (large)." The processor 110 acquires the level inputted through the input screen DS.

In S220a, the processor 110 selects a look-up table on the basis of the ratio Rt of each colorant and the reduction level Lv selected by the user. A sample procedure for S220a is shown in detail below the flowchart in FIG. 9. In S400 the processor 110 determines whether the reduction level Lv is Lv1 (small). If the reduction level Lv is Lv1 (small) (S400: YES), in S410 the processor 110 selects the reference look-up table LUTs and ends S220a.

If the reduction level Lv is not Lv1 (small) (S400: NO), in S420 the processor 110 determines whether the reduction level Lv is Lv2 (medium). If the reduction level Lv is Lv2 (medium) (S420: YES), in S430 the processor 110 selects a reduction look-up table in which the gradation values of color components whose ratio Rt exceeds the first threshold Rt1 are modified by the first correction amount (10 in this example) in the first modification process and subsequently ends S220a. For example, the processor 110 selects the reduction look-up table LUTj1z when the ratio Rt for one color component j exceeds the first threshold Rt1, and selects the reduction look-up table LUTj1k1z for the color component j having the largest ratio Rt and the color component k having the second largest ratio Rt when the ratio Rt for two or more color components exceeds the first threshold Rt1. The processor 110 selects the reduction look-up table LUTj1z for the color component j having the largest ratio Rt when none of the ratios Rt exceeds the first threshold Rt1. Alternatively, the processor 110 may select the reference look-up table LUTs when none of the ratios Rt exceeds the first threshold Rt1.

If the reduction level Lv is not Lv2 (medium) (S420: NO), i.e., when the reduction level Lv is Lv3 (large), in S440 the processor 110 selects a reduction look-up table in which the gradation values of color components whose ratio Rt exceeds the first threshold Rt1 are corrected by the second correction amount (20 in this example) in the first modification process, and subsequently ends S220a. For example, the processor 110 selects the reduction look-up table LUTj2z when the ratio Rt for one color component j exceeds the first threshold Rt1, and selects the reduction look-up table LUTj2k2z for the color component j having the largest ratio Rt and the color component k having the second largest ratio Rt when the ratio Rt for two or more color components exceeds the first threshold Rt1. The processor 110 selects the reduction look-up table LUTj2z for the color component j having the largest ratio Rt when none of the ratios Rt exceeds the first threshold Rt1. Alternatively, the processor 110 may select the reference look-up table LUTs or the reduction look-up table LUTj1z in which the gradation values of color component j having the largest ratio Rt are corrected by the first correction amount in the first modification process when none of the ratios Rt exceeds the first threshold Rt1.

After selecting look-up table (a reference look-up table LUTs or a reduction look-up table LUTz) in S220a, the processor 110 executes the process in S230 according to the selected look-up table. The process in S230 of FIG. 9 is identical to that in FIG. 7. Subsequently, the processor 110 ends the process of FIG. 9.

As with the first embodiment described above, the third embodiment in FIG. 9 generates a plurality of reduction look-up tables LUTz having differing reduction amounts for each colorant. Thereafter, in S215a the processor 110 prompts the user to specify the degree of reduction for colorants (the reduction level Lv in this example), in S220a selects a look-up table (a reference look-up table LUTs or a reduction look-up table LUTz) corresponding to the specified level, and in S230 converts the gradation values using the look-up table selected in S220a. Next, the processor 110 generates print data in S40 and S50 of FIG. 6. In this way, the processor 110 can generate print data in which the consumption of colorants is reduced on the basis of the user-specified level. In the present embodiment, the processor 110 can select reduction look-up tables LUTz that have a greater reduction amount the larger the level of reduction specified by the user in order to generate print data that can achieve reduction amounts suited to the user's preference. If the color component whose consumption is to be reduced is set according to the residual amount Cr of the colorant, as in the second embodiment of FIG. 8, the processor 110 may select a reduction look-up table LUTz according to the degree of reduction specified by the user, as described in the third embodiment. In either case, it is preferable that the processor 110 selects a reduction look-up table LUTz having a greater reduction amount for higher levels of reduction specified by the user.

D. Fourth Embodiment

Figure 10:
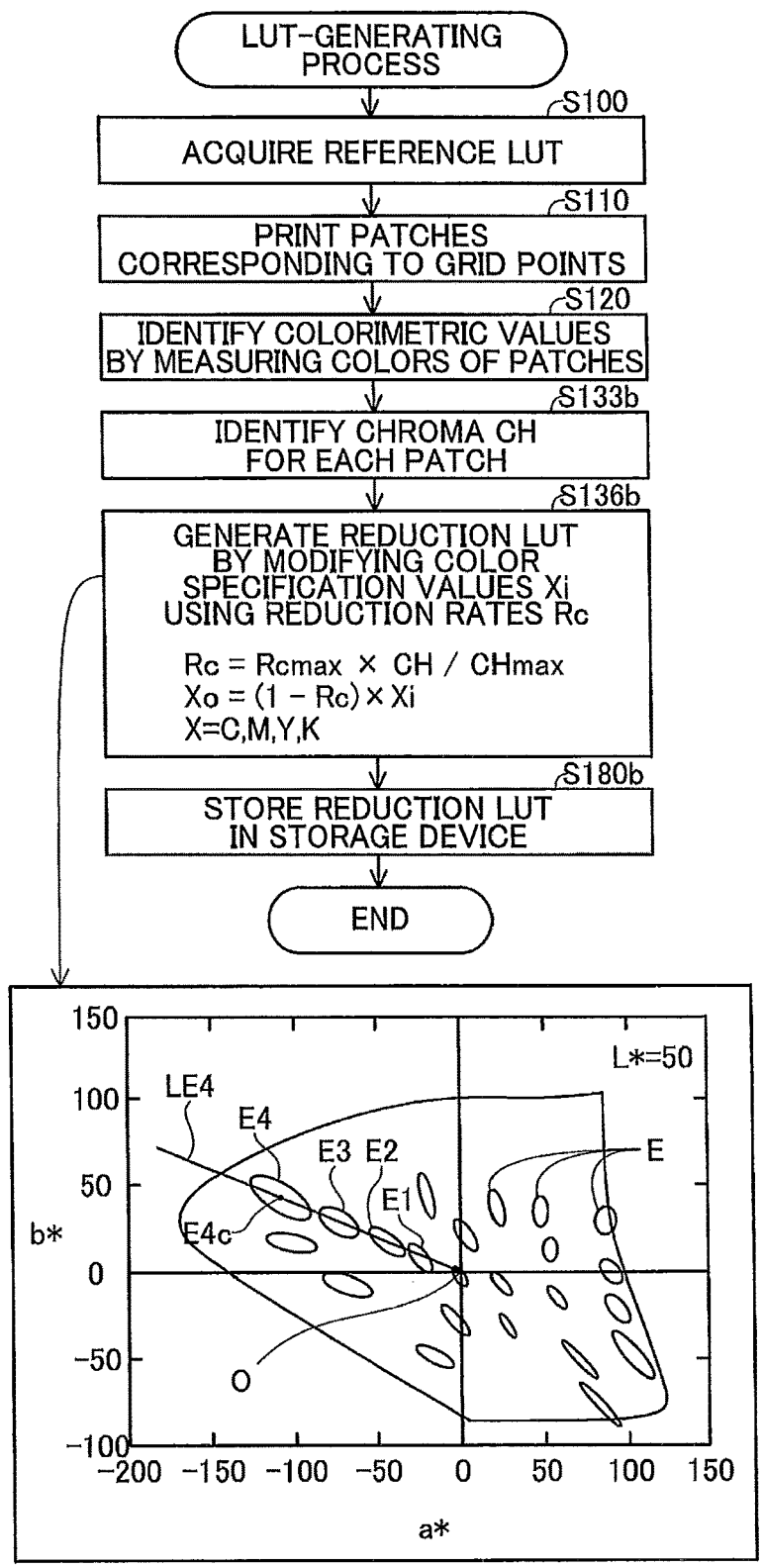
FIG. 10 is an explanatory diagram including a flowchart illustrating steps in a process for generating look-up tables according to a fourth embodiment of the present disclosure.

FIG. 10 is a flowchart illustrating steps in a process for generating look-up tables according to a fourth embodiment of the present disclosure. The process in FIG. 10 differs from that in FIG. 2 in that gradation values are modified according to chroma. S100, S110, and S120 of FIG. 10 are identical to steps S100, S110, and S120 of FIG. 2.

In S133b the processor 110 calculates a chroma CH for each patch on the basis of the colorimetric values. In the present embodiment, the chroma CH is calculated as the square root of the sum of the square of the a* value and the square of the b* value.

In S136b the processor 110 identifies the largest chroma CHmax among the chromas CH for the plurality of patches, and calculates a reduction rate Rc based on the following equation.

$$Rc = Rcmax \times CH/CHmax$$

Here, the maximum reduction rate Rcmax is a preset value. The maximum reduction rate Rcmax is preferably set such that changes in the printed colors caused by modifying gradation values are not excessive. In this example, the maximum reduction rate Rcmax is 10%. As shown in the above equation, the reduction rate Rc is higher for larger chromas CH.

FIG. 11A is a table showing sample calculations of reduction rates Rc. The table in FIG. 11A represents part of a sample reference look-up table LUTs in which one row indicates one color correspondence between RGB and CMYK values. The table also includes the colorimetric values (L*, a*, and b*) and the calculated chromas CH. The largest chroma CHmax in FIG. 11A denotes the maximum value among chromas CH in the plurality of color correspondences. Sample reduction rates Rc provided on the right side of FIG. 11A denote reduction rates Rc computed using this largest chroma CHmax.

The processor 110 generates a modified gradation value table LUTx using the calculated reduction rates Rc. FIG. 11B is a table representing part of a sample modified gradation value table LUTx in which one row specifies one color correspondence between RGB and CMYK color values. The modified gradation value table LUTx is generated by multiplying the gradation value for each CMYK color in the reference look-up table LUTs by (100%−reduction rate Rc). In S136b of FIG. 10, Xi indicates the gradation value for each CMYK color in the reference look-up table LUTs, i.e., Ci, Mi, Yi, and Ki respectively represent the CMYK color values at the i-th grid point. Xo indicates the modified gradation value for each CMYK color in the modified gradation value table LUTx, i.e. Co, Mo, Yo, and Ko respectively represent the CMYK modified color values at the same i-th grid point. The reduction rate Rc correlated with each color correspondence is used as the reduction rate Rc in these calculations. The correction amount for gradation values is obtained by multiplying the original gradation value by the reduction rate Rc. As described above, the CMYK gradation values represent the consumption per unit area of the corresponding colorants. Hence, when using the CMYK gradation values in the modified gradation value table LUTx, the consumption amounts of the colorants can be reduced by an amount corresponding to the reduction rates Rc from the consumption amounts when using the gradation values in the reference look-up table LUTs.

In S180b of FIG. 10, the processor 110 stores the modified gradation value table LUTx generated in S136b in a storage device such as the nonvolatile storage device 130. Subsequently, the processor 110 ends the process of FIG. 10. As will be described later, the reduction look-up table LUTz used in a printing process according to the present embodiment is expressed using both the reference look-up table LUTs and modified gradation value table LUTx. Specifically, the modified gradation value table LUTx represents gradation values for some of the CMYK color components, and the reference look-up table LUTs represents gradation values for the remaining CMYK color components. The color components referencing gradation values in the modified gradation value table LUTx and the color components referencing gradation values in the reference look-up table LUTs are selected according to the target image data. In this way, the reduction look-up table LUTz is represented by both the reference look-up table LUTs and the modified gradation value table LUTx. Thus, by generating the modified gradation value table LUTx, it can be said that a plurality of reduction look-up tables LUTz is generated in the process of S136b. Further, by storing the modified gradation value table LUTx in the storage device, it can be said that a plurality of reduction look-up tables LUTz is stored in the storage device in the process of S180b.

The reduction rate Rc is greater for larger chromas CH for the following reason. The graph in the bottom of FIG. 10 shows an example of a MacAdam ellipse expressed in an a*b* plane in the CIELAB color space. The horizontal axis represents a* and the vertical axis represents b*. The graph in FIG. 10 shows an example of a MacAdam ellipse in an a*b* plane when the L* value is 50. The graph was proposed by Robertson in 1977. Each ellipse in the graph represents a MacAdam ellipse. Each MacAdam ellipse is a region in which all colors are indistinguishable to the human eye from the color represented by the color specification values at the center of the ellipse. Thus, any two colors represented by color specification values inside the same MacAdam ellipse appear to be the same color. Accordingly, an observer cannot easily recognize any difference in the plurality of colors within a MacAdam ellipse.

A straight line LE4 in the graph of FIG. 10 extends from a point of origin O through a color specification value E4c in the center of an ellipse E4. The hues along lines extending from the point of origin O in the a*b* plane are substantially the same. Hereinafter, a line extending from the point of origin O will be called a hue line. The graph in FIG. 10 shows four ellipses E1, E2, E3, and E4 juxtaposed in the direction that the straight line LE4 extends from the point of origin O. All of the ellipses E1, E2, E3, and E4 overlap the straight line LE4. Hence, hues between the ellipses E1, E2, E3, and E4 are substantially the same. Further, the ellipses E1, E2, E3, and E4 increase in size the farther away from the point of origin O. As described above, the distance between a color value in the a*b* plane and the point of origin O represents the chroma CH. Accordingly, the ellipses E1, E2, E3, and E4 become larger as the chroma CH increases. While not shown in the graph, ellipses are generally larger for larger chromas CH, even when one or both of the hue and lightness differs. Therefore, changes in color caused by a reduction in the consumption of colorant are difficult to detect for larger chromas CH, even when the reduction amount is great. Hence, the reduction rate Rc in the present embodiment is set higher for larger chromas CH. In this way, it is possible to reduce the consumption of colorant based on the chroma CH, while preventing noticeable changes in color caused by such reduction.

Figure 12:
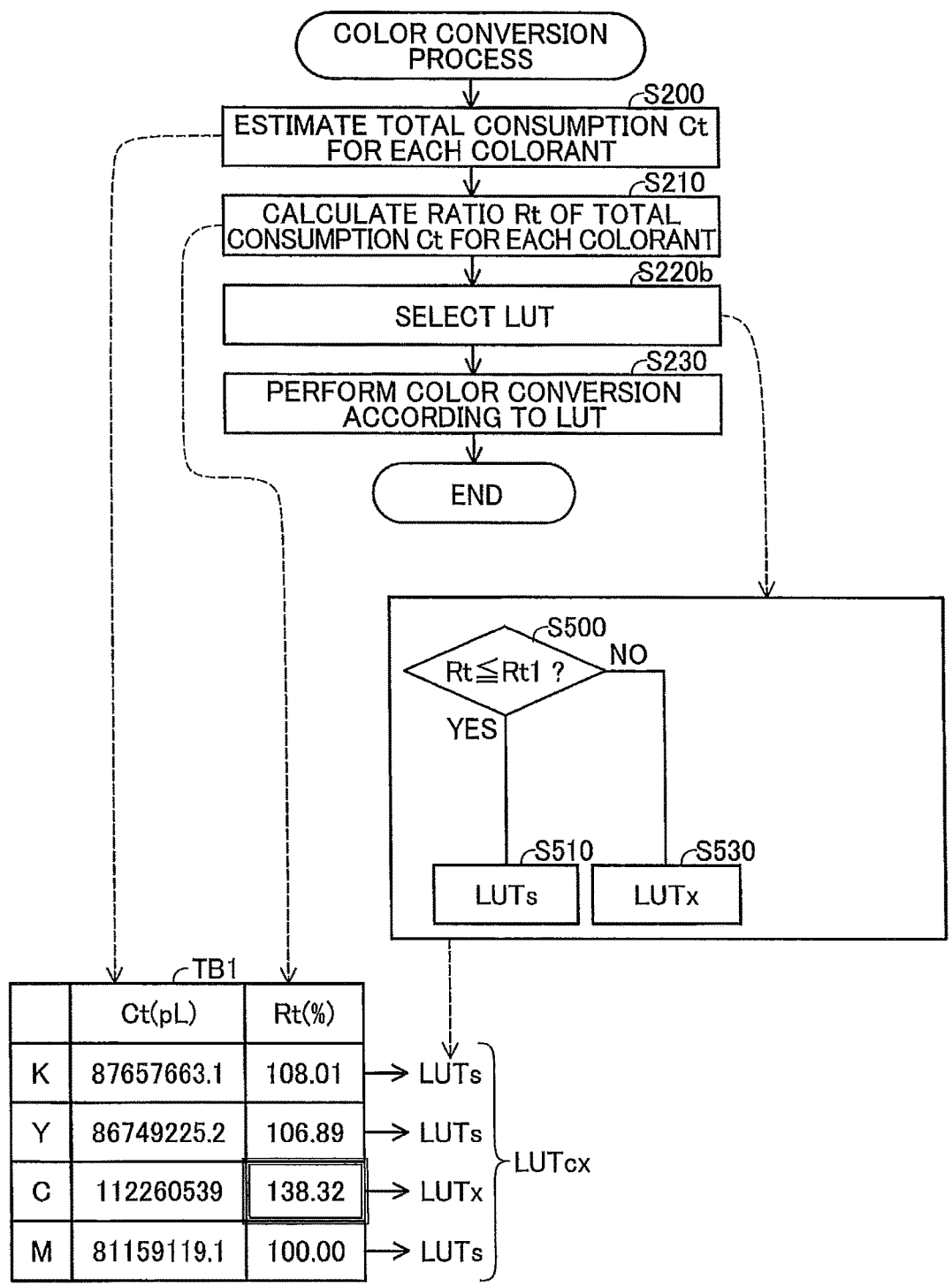
FIG. 12 is an explanatory diagram including a flowchart illustrating steps in a color conversion process according to the fourth embodiment of the present disclosure.

FIG. 12 is a flowchart illustrating steps in a sample color conversion process according to the fourth embodiment. The printing process in the fourth embodiment is performed according to the flowchart in FIG. 6, while the color conversion process of S30 is performed according to the flowchart in FIG. 12. S200 and S210 of the fourth embodiment are identical to S200 and S210 in FIG. 7. The table TB1 in FIG. 12 is identical to the table TB1 in FIG. 7 and shows an example of the total consumption Ct and ratio Rt for each of the CMYK colors.

In S220b the processor 110 selects a look-up table (a reference look-up table LUTs or a modified gradation value table LUTx on the basis of the ratio Rt of each colorant. A sample procedure for S220b is shown beneath the flowchart of FIG. 12. In S500 of this procedure, the processor 110 determines whether the ratio Rt is less than or equal to the first threshold Rt1. When the ratio Rt is less than or equal to the first threshold Rt1 (S500: YES), in S510 the processor 110 selects gradation values from the reference look-up table LUTs. When the ratio Rt is greater than the first threshold Rt1 (S500: NO), in S530 the processor 110 selects gradation values from the modified gradation value table LUTx. Note that the process in S500, S510, and S530 is performed for each color component. Since the cyan C ratio Rt is greater than the first threshold Rt1 in the sample table TB1, the processor 110 selects cyan C gradation values from the modified gradation value table LUTx. However, since the ratios Rt for the other color components M, Y, and K are less than or equal to the first threshold Rt1, the processor 110 selects gradation values for the corresponding color components from the reference look-up table LUTs. A look-up table LUTcx is generated on the basis of the gradation values selected above as a reduction look-up table LUTz. FIG. 11C shows a table representing a partial sample of the look-up table LUTcx as the reduction look-up table LUTz (Hereinafter, also called the reduction look-up table LUTcx). As shown in FIG. 11C, the cyan C gradation values Cx from the modified gradation value table LUTx in FIG. 11B are used for cyan C in the reduction look-up table LUTcx, while gradation values MYKs from the reference look-up table LUTs in FIG. 11A are used for magenta M, yellow Y, and black K in the reduction look-up table LUTcx.

In S230 the processor 110 converts the RGB gradation values for each pixel representing the target image to CMYK gradation values according to the reduction look-up table LUTz selected in S220b, and subsequently ends the process of FIG. 12. Note that the reduction look-up table LUTz selected in S220b is identical to the reference look-up table LUTs when none of the ratios Rt exceeds the first threshold Rt1.

In the fourth embodiment described above, the processor 110 acquires the chromas CH of patches corresponding to the L number of second reference color specification values (CMYK color specification values in this example; S133b in FIG. 10). Hence, in S136b of FIG. 10 the processor 110 modifies the second color specification values in order to reduce the consumption amounts of at least one colorant, and generates reduction look-up tables LUTz using the modified color specification values. Further, L number of grid values are arranged at substantially equal intervals in the color solid CC, as described with reference to FIG. 3A. Hence, the L number of color correspondences in the reference look-up table LUTs include a plurality of color correspondences represented by a plurality of grid values having substantially the same hue but differing chroma; for example, a plurality of grid points belonging to the same hue range, such as the uniform hue range HR1 in FIG. 3B and the uniform hue range HR in FIG. 3D. Here, the reduction rate Rc is greater for larger chromas CH. Accordingly, for a first color and a second color having the same hue but differing chroma, the reduction rate Rc for modifying second color specification values representing the first color (i.e., the reduction rate for the consumption of colorant) is greater than the reduction rate Rc for modifying second color specification values representing the second color having a smaller chroma CH than the first color. As described above, the human eye cannot easily recognize differences in color as the chroma becomes large. Therefore, it is possible to reduce the consumption of colorant while suppressing an unnatural appearance of printed colors by setting the reduction rate for the consumption of colorants resulting from the modification of second reference color specification values having a relatively high chroma greater than the reduction rate for the consumption of colorants resulting from the modification of second reference color specification values having a relatively low chroma.

Further, in the fourth embodiment the processor 110 acquires L number of colorimetric values in S120 of FIG. 10 by measuring the colors of patches corresponding to the L number of second reference color specification values, and identifies the L number of chromas CH in S133b using the L number of colorimetric values. In this way, the processor 110 can use suitable chroma obtained from colorimetric values to set the reduction rates Rc, and consequently, to generate the reduction look-up tables LUTz.

E. Fifth Embodiment

Figure 13:
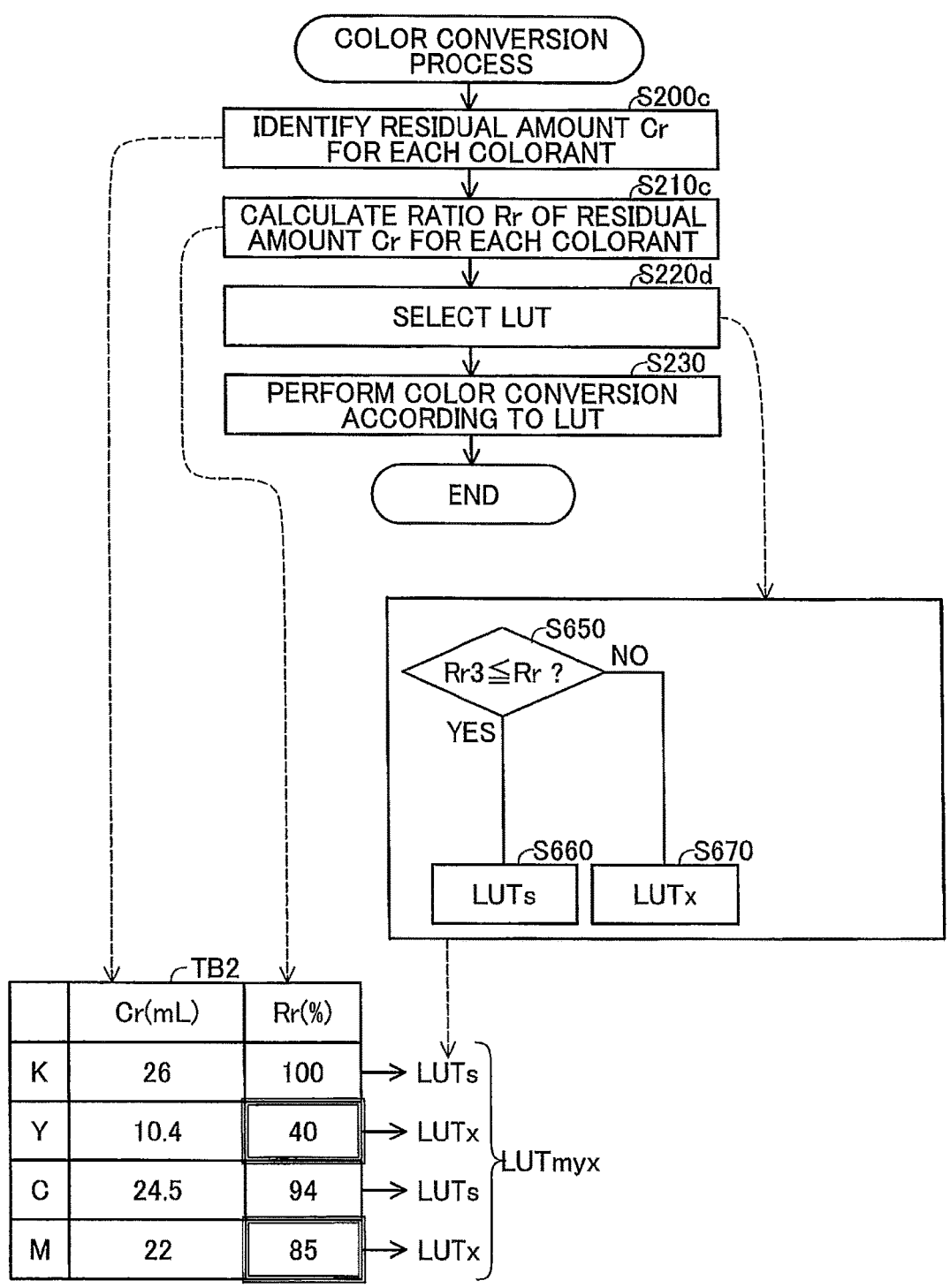
FIG. 13 is an explanatory diagram including a flowchart illustrating steps in a color conversion process according to a fifth embodiment of the present disclosure.

FIG. 13 is a flowchart illustrating steps in the color conversion process according to a fifth embodiment of the present disclosure. The color conversion process in FIG. 13 may be executed in place of the color conversion process in FIG. 12 and differs from the fourth embodiment of FIG. 12 in that the residual amount Cr is used in place of the total consumption Ct. S200c and S210c are identical to the same steps in FIG. 8.

In S220d the processor 110 selects a look-up table (a reference look-up table LUTs or a modified gradation value table LUTx) using the ratio Rr for each colorant. Detailed steps in the procedure of S220d are shown beneath the flowchart in FIG. 13. In S650 the processor 110 determines whether the ratio Rr is greater than or equal to the third threshold Rr3. If the ratio Rr is greater than or equal to the third threshold Rr3 (S650: YES), in S660 the processor 110 selects the gradation values from the reference look-up table LUTs. However, if the ratio Rr is smaller than the third threshold Rr3 (S650: NO), in S670 the processor 110 selects gradation values from the modified gradation value table LUTx. The processor 110 performs the process in S650, S660, and S670 for each color component. Since the ratios Rr for yellow Y and magenta M in the example of table TB2 are smaller than the third threshold Rr3, the gradation values for yellow Y and magenta M are selected from the modified gradation value table LUTx. Since the ratios Rr of the other color components cyan C and black K are greater than the third threshold Rr3, gradation values for cyan C and black K are selected from the reference look-up table LUTs. The processor 110 generates a look-up table LUTmyx represented by the gradation values selected above to be used for color conversion as a reduction look-up table LUTz (also called the reduction look-up table LUTmyx).

In S230 the processor 110 converts the RGB gradation values for each pixel representing the target image to CMYK gradation values according to the reduction look-up table LUTz selected in S220d, and subsequently ends the process of FIG. 13. Note that the reduction look-up table LUTz selected in S220d is identical to the reference look-up table LUTs when none of the ratios Rr is smaller than the third threshold Rt3.

In the fifth embodiment described above, the processor 110 generates a plurality of reduction look-up tables LUTz in the process of FIG. 10 that differ in which of the colorants has the greatest reduction in consumption amount. For example, the processor 110 generates the reduction look-up table LUTcx (not shown) for modifying the second reference color specification values for cyan C so that the consumption amount (the consumption per unit area, for example) of the cyan C colorant is reduced most among the plurality of colorants, and a reduction look-up table LUTmx (not shown) for modifying the second reference color specification values for magenta M so that the consumption amount of the magenta M colorant is reduced most among the plurality of colorants. Thereafter, in the process described in FIG. 13, the processor 110 uses the reduction look-up table LUTz designed to reduce consumption of a specific colorant most when the residual amount Cr of that colorant is lowest. For example, when the residual amount Cr of cyan C is lowest and only the ratio Rr of cyan C is smaller than the third threshold Rr3, the reduction look-up table LUTcx described above may be used. Alternatively, when the residual amount Cr of magenta M is lowest and only the ratio Rr of magenta is smaller than the third threshold Rr3, the reduction look-up table LUTmx described above may be used. Further, when both the ratio Rr of cyan C and ratio Rr of magenta M are smaller than the third threshold Rr3 and both the ratio Rr of yellow Y and ratio Rr of Black K are equal to or greater than the third threshold Rr3, gradation values for cyan C are selected from the reduction look-up table LUTcx and gradation values for magenta M are selected from the reduction look-up table LUTmx, whereas unmodified second reference color specification values selected from the reference look-up table LUTs are used as gradation values for yellow Y and black K. With this method, only the consumption amount of the colorant having relatively low residual amount Cr is reduced, thereby suppressing an increase in differences among residual amounts Cr of the colorants. Alternatively, the consumption amount of the colorant having the lowest residual amount Cr may be reduced.

F. Sixth Embodiment

Figure 14:
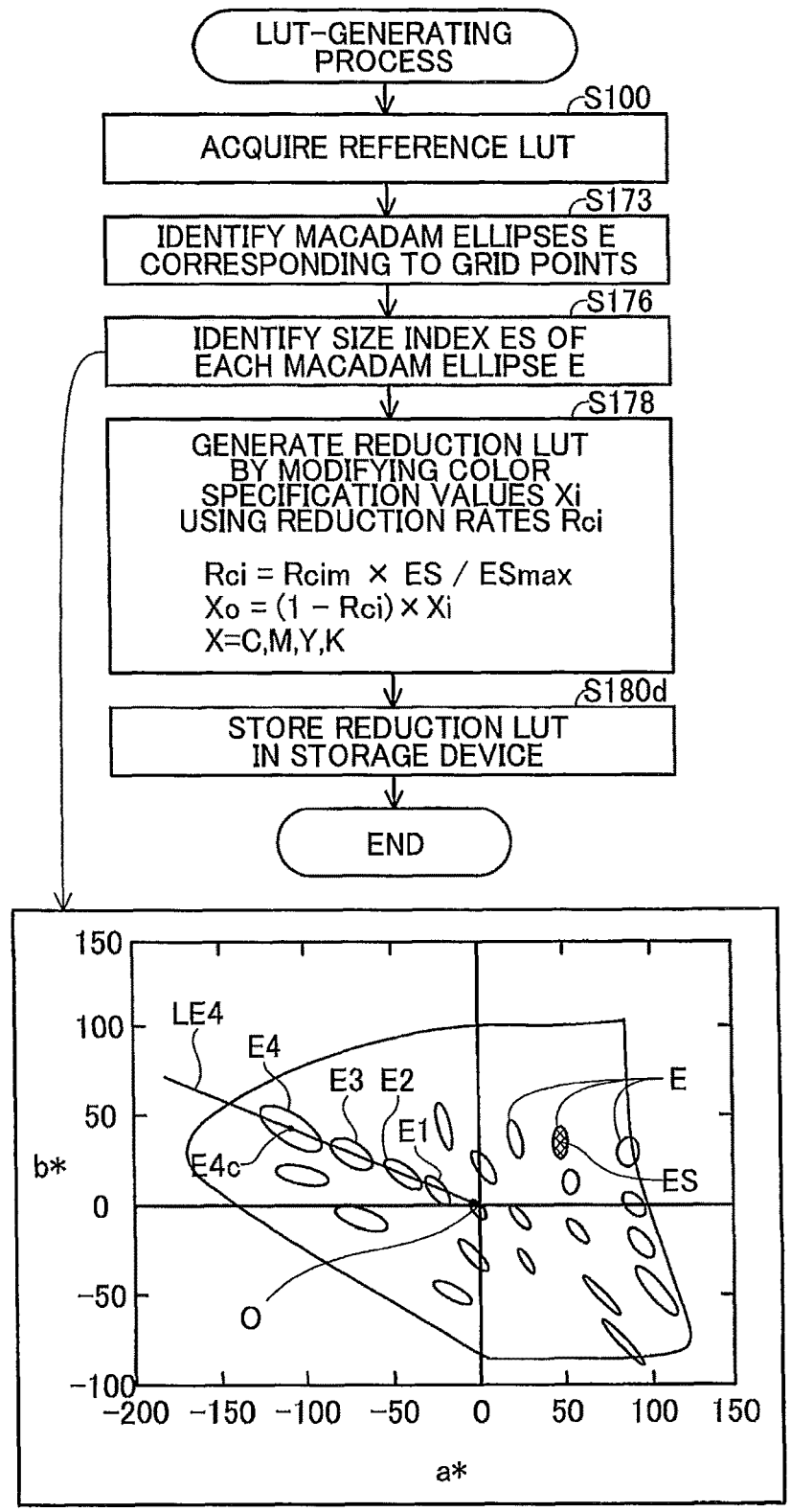
FIG. 14 is an explanatory diagram including a flowchart illustrating steps in a process for generating look-up tables according to a sixth embodiment of the present disclosure.

FIG. 14 is a flowchart illustrating steps in a process for generating look-up tables according to a sixth embodiment of the present disclosure. The process in FIG. 14 is executed in place of the process in FIG. 10 described in the third embodiment and differs from the third embodiment in that a size index ES representing the size of a MacAdam ellipse E is used in place of chroma. S100 of FIG. 14 is identical to S100 in FIG. 10.

In S173 the processor 110 identifies the plurality of MacAdam ellipses E correlated with the plurality of second reference color specification values in the reference look-up table LUTs. A MacAdam ellipse E in the present embodiment is a color range obtained by projecting, on the a*b* plane, a color range in which colors printed according to the second reference color specification values are indistinguishable from colors printed according to color specification values acquired by modifying the second reference color specification values. The MacAdam ellipses E may be identified in advance through evaluation tests, for example. Ellipse data representing the MacAdam ellipses E is pre-stored in the nonvolatile storage device 130 (not indicated in the flowchart). By referencing this ellipse data, the processor 110 can identify MacAdam ellipses E corresponding to the second reference color specification values. Note that the ellipse data may be in any format that represents MacAdam ellipses E. For example, the ellipse data may be data that represents color specification values (i.e., the second reference color specification values) for the center of the MacAdam ellipse E, the length and orientation of the major axis of the MacAdam ellipse E, and the length and orientation of the minor axis of the MacAdam ellipse E.

In S176 the processor 110 identifies the size index ES of each MacAdam ellipse E. The area of the MacAdam ellipse E is used as the size index ES in the present embodiment. The processor 110 identifies the size index ES by calculating the area of each MacAdam ellipse E identified by the ellipse data. Alternatively, ellipse data may already include data specifying the size index ES of each MacAdam ellipse E. In this case, the processor 110 can identify a size index ES by referencing the ellipse data.

In S178 the processor 110 identifies a maximum index ESmax among the size indices ES for the plurality of MacAdam ellipses E and calculates a reduction rate Rci according to the following equation.

$$Rci = Rcim \times ES/ESmax$$

Rcim in the above equation denotes the maximum reduction rate and is a preset value. The maximum reduction rate Rcim is set in the same way as the maximum reduction rate Rcmax described earlier (10% in this example). As shown in the above equation, the reduction rate Rci becomes larger as the size index ES (the area of the MacAdam ellipse E in this case) increases.

The processor 110 generates the modified gradation value table LUTx using the reduction rate Rci calculated above. The method of generating the modified gradation value table LUTx is identical to the method described in S136b of FIG. 10 when the reduction rate Rc is replaced with the reduction rate Rci. In S180d the processor 110 stores the modified gradation value table LUTx generated in S178 in a storage device such as the nonvolatile storage device 130, and subsequently ends the process of FIG. 14. In the sixth embodiment, the color conversion process is identical to that in the third embodiment described in FIG. 12. As in FIG. 10, the reduction look-up table LUTz used in color conversion is represented by a combination of the reference look-up table LUTs and modified gradation value table LUTx. Therefore, it may be phrased that the process in S178 generates a plurality of reduction look-up tables LUTz by generating the modified gradation value table LUTx. Similarly, it can be phrased that the process in S180d stores a plurality of reduction look-up tables LUTz in the storage device by storing the modified gradation value table LUTx in the storage device.

Note that the reduction rate Rci is larger when the size index ES is greater for the following reason. As described above, the MacAdam ellipse E specifies a range of colors whose color differences cannot be distinguished by the human eye. Hence, when the size index ES of a MacAdam ellipse E is great, changes in colors caused by a reduction in the consumption of colorant cannot be detected, even when the consumption amount of the colorant is reduced by a large amount. Therefore, the reduction rate Rci is set in the present embodiment so that the reduction rate Rci is larger when the size index ES is greater. In this way, the processor 110 can reduce the consumption of colorant while suppressing noticeable changes in color caused by reducing the consumption of colorant.

Further, as described in the third embodiment in FIG. 10, the MacAdam ellipse E in the a*b* plane is larger when farther away from the point of origin O, i.e., when the chroma is larger. Thus, the size index ES is an example of a chroma index representing the chroma of the second reference color specification value. In S176 the area ES is identified as the chroma index. Next, the reduction rate Rci described above is set based on the area ES serving as the chroma index. Specifically, the reduction rate Rci is set larger as the size index ES becomes larger, i.e., as the chroma represented by the size index ES becomes higher.

G. Seventh Embodiment

Figure 15:
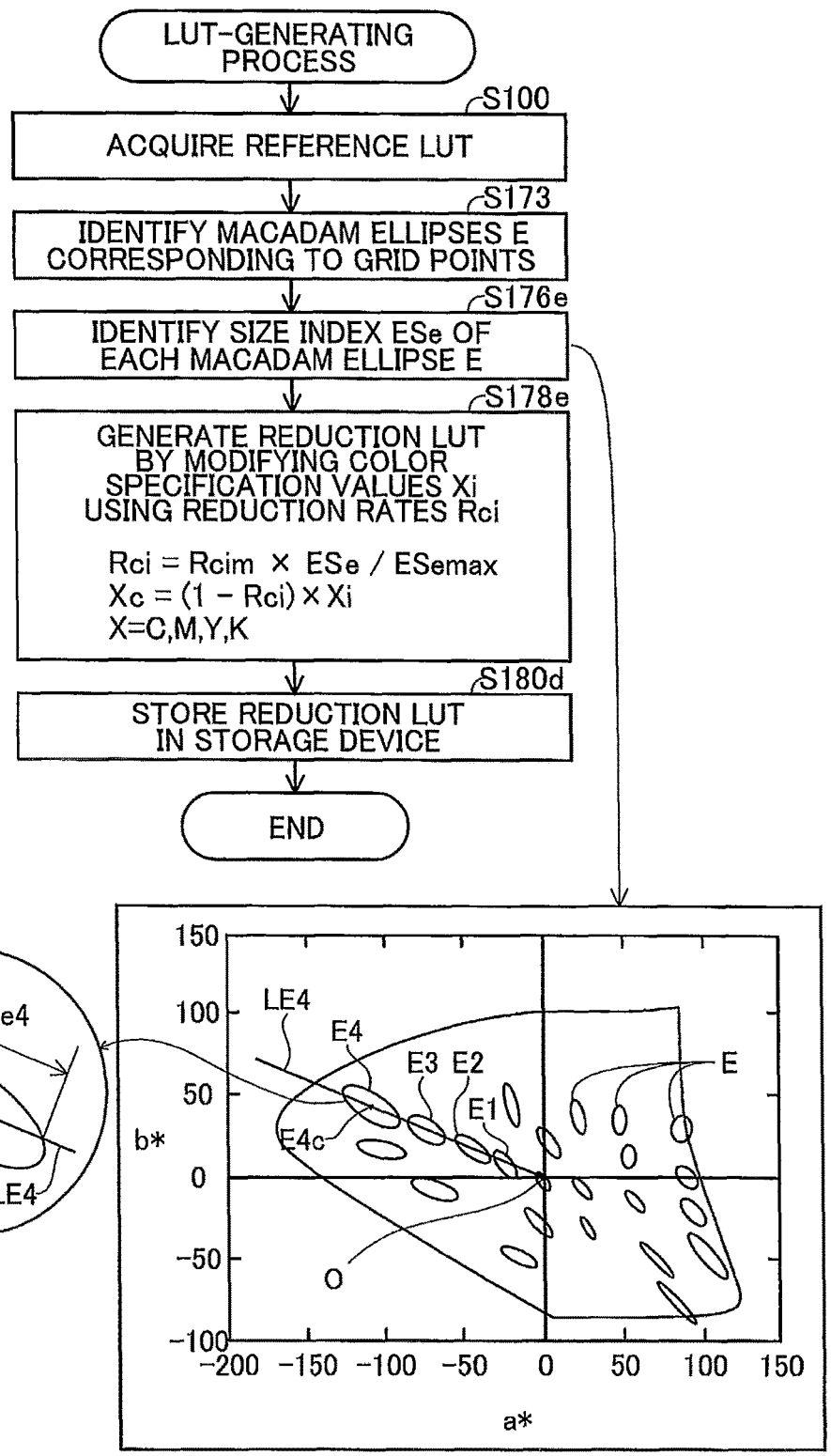
FIG. 15 is an explanatory diagram including a flowchart illustrating steps in a process for generating look-up tables according to a seventh embodiment of the present disclosure.

FIG. 15 is a flowchart illustrating steps in a process for generating look-up tables according to a seventh embodiment of the present disclosure. In the process of the seventh embodiment, step S176 of FIG. 15 has been replaced with step S176e in FIG. 15, and step S178 of FIG. 15 has been replaced with step S178e in FIG. 15. The process according to the seventh embodiment differs from the process in the sixth embodiment shown in FIG. 14 in that the length of the segment of a hue line that falls within a MacAdam ellipse E is used as a size index ESe in place of the area ES of the MacAdam ellipse E used in the sixth embodiment. A hue line defined in the seventh embodiment is a straight line that passes through the point of origin O and the center of the MacAdam ellipse E, i.e., the color point representing the second reference color specification value. FIG. 15 includes an enlarged view of the ellipse E4. The straight line LE4 in FIG. 15 denotes the hue line that passes through the center E4c of the ellipse E4 (the second color specification value E4c). A length ESe4 in FIG. 15 denotes the length of the segment of the straight line LE4 that falls within the ellipse E4. This length ESe4 is used as the size index for the ellipse E4. Similarly, the lengths of segments of hue lines that fall within the other MacAdam ellipses E and pass through the centers of those MacAdam ellipses E are used as the size indices ESe for those MacAdam ellipses E. The lengths of the segments of hue lines within the MacAdam ellipses E, i.e., the inner segment lengths are greater for larger MacAdam ellipses E. Accordingly, the inner segment length can be considered related to the size of the MacAdam ellipse E.

The processor 110 identifies the two intersecting points of each MacAdam ellipse E identified by the ellipse data and the corresponding hue line passing through the center of the MacAdam ellipse E (the second reference color specification value) and calculates the size index ESe from the distance between these two intersecting points. Alternatively, the ellipse data may already include data specifying the size index ESe. In this case, the processor 110 can identify the size index ESe by referencing the ellipse data.

After completing S176e, in S178e the processor 110 uses the size index ESe in place of the size index ES used in S178 of FIG. 14 and identifies the largest size index ESe in place of the maximum index ESmax identified in S178 of FIG. 14 to calculate the reduction rate Rci. The reduction rate Rci increases as the size index ESe increases. Thereafter, the processor 110 uses the reduction rate Rci calculated above to generate the modified gradation value table LUTx. Step S180d is identical to that described in the sixth embodiment.

In this way, the length ESe for the inner segment of a hue line is used in place of the area ES of the MacAdam ellipse E as an index related to the size of the MacAdam ellipse E. Here as well, a large size index ESe indicates a large size of the MacAdam ellipse E. Hence, if the size index ESe is large, color changes caused by reducing the consumption of colorant are difficult to distinguish, even when the reduction amount of the consumption of colorant is high. Therefore, the reduction rate Rci is set in the present embodiment to be larger when the size index ESe is larger. As a result, the processor 110 can reduce the consumption of colorant while suppressing noticeable changes in color caused by such reduction.

Note that a large size index ESe not only denotes a large size of the MacAdam ellipse E, but also a high chroma. Hence, the size index ESe is an example of a chroma index representing the chroma of the second reference color specification value. Thus, in S176e the length ESe is identified as the chroma index. Subsequently, in S178e the reduction rate Rci is set based on the length ESe serving as the chroma index. Specifically, the reduction rate Rci is set to a larger value for a larger size index ESe, i.e., for a higher chroma represented by the size index ESe.

H. Variations of the Embodiments (1) In the first modification process or the modification process for modifying gradation values of second reference color specification values (for example, S130 in FIG. 2, S136b in FIG. 10, S178 in FIG. 14, and S178e in FIG. 15), the total number of modified color specification values may be an arbitrary number Q that is no greater than the total number L of color correspondences (where Q is an integer between 1 and L, inclusive). For example, the gradation values targeted for modification among those gradation values of color components to be modified may be gradation values specifying a greater consumption of colorant than a threshold value (for example, gradation values greater than or equal to the threshold value or gradation values less than or equal to the threshold value). This threshold value may be predetermined or may be specified by a user.

(2) In the first modification process or the modification process for modifying gradation values of second reference color specification values (for example, S130 in FIG. 2), the total number of correction amounts used for modification may be three or one rather than the two described in the present embodiments (i.e., the first correction amount and second correction amount). In general, the total number of correction amounts (i.e., the total number of reduction amounts in the consumption of colorants) may be any number of one or greater. In any case, it is preferable that the reduction look-up table selected in the color conversion process of FIG. 7 use a higher reduction amount for larger total consumptions Ct. In other words, it is preferable that the processor 110 select a reduction look-up table with a large reduction amount rather than a small reduction amount when the total consumption Ct is high. Further, the reduction look-up table selected in the color conversion process of FIG. 8 preferably has a larger reduction amount for smaller residual amounts Cr. In other words, it is preferable that the processor 110 select a reduction look-up table having a larger reduction amount than a smaller reduction amount when the residual amount Cr is small.

(3) In S160 and S170 of FIG. 2, a variety of values related to color difference may be used in place of the color difference Dc (hereinafter referred to as a "color difference index"). For example, the Euclidean distance in the CMYK color space between the original color specification value and modified color specification value may be used as the color difference index. In general, any of various values related to color difference may be employed as the color difference index. In any case, the gradation values are preferably readjusted in S170 so that the color difference index approaches a target color difference index. The target color difference index may be preset or may be a variable calculated on the basis of a plurality of color difference indices. For example, the target color difference index may be calculated as the mean, maximum, median, mode, or minimum value of the plurality of color difference indices. The plurality of color difference indices used for calculating the target color difference index are preferably associated with the plurality of second color specification values whose gradation values were modified in the first modification process or the modification process (S130 of FIG. 2, for example).

Further, while the process for remodifying second color specification values based on a color difference index in the present embodiments modifies the second color specification values whose color difference index differs from the target color difference index in order that the color difference index approaches the target color difference index, any of various processes may be employed. For example, the processor 110 may employ a process for modifying the second color specification values whose color difference represented by the color difference index is greater than a reference so that the color difference represented by the color difference index is maintained less than or equal to the reference. The reference may be a preset value or may be a value set by the user. In this case, S140, S150, S160, and S170 of FIG. 2 may be omitted, and the intermediate look-up tables generated in S130 may be used as the final reduction look-up tables LUTz.

(4) In S133b and S136b of FIG. 10, various values related to chroma may be used in place of the chroma CH (hereinafter called the "chroma index"). For example, the processor 110 may identify chroma values corresponding to the second reference color specification values in the reference look-up table LUTs by referencing predetermined correspondences between CMYK color specification values and chroma values (in a look-up table, for example). In this case, the steps for printing patches (S110) and measuring the patch colors (S120) are omitted. Alternatively, the distance between the grid value and the achromatic line AL in the RGB color solid CC (see FIG. 3A) may be used as the chroma index. In general, any of various values related to chroma may be used as the chroma index. In any case, when two second reference color specification values having the same hue but a different chroma index are modified in the first modification process or the modification process, the reduction rate (for example, the reduction rate Rc in FIG. 10) for the consumption of colorant resulting from modifying second reference color specification values having a first chroma index is preferably higher than the reduction rate for the consumption of colorant resulting from modifying second reference color specification values having a second chroma index that specifies a lower chroma than the first chroma index. This configuration can reduce the consumption of colorants while suppressing an unnatural appearance in the printed colors.

Various methods may be employed to compare hues between two second reference color specification values. For example, the processor 110 may determine that two reference color specification values have the same hue when the two first reference color specification values corresponding to the two second reference color specification values fall in a region in the color solid CC of FIG. 3A representing colors with the same hue (the area RA, for example). Further, the processor 110 may determine that two reference color specification values have the same hue when two second reference color specification values in the a*b* plane of the CIELAB color space fall on the same hue line (the straight line LE4 in FIG. 10, for example). Further, the processor 110 may determine that two reference color specification values have the same hue when two MacAdam ellipses in the a*b* plane of the CIELAB color space that correspond to two second reference color specification values overlap the same hue line.

Further, at least one of the uniform hue range HR1 described in FIG. 3B and the uniform hue range HR described in FIG. 3D may be preset as a hue range in which any two colors have approximately the same hue. In any case, when two grid values fall in a uniform hue range (at least one of the predetermined uniform hue range HR1 and uniform hue range HR, for example), the two colors corresponding to these two grid values can be considered to have approximately the same hue.

(5) In S176 of FIG. 14 and S176e of FIG. 15, various values related to the size of the MacAdam ellipse may be used in place of the area ES and length ESe (hereinafter called the "size index"). For example, the processor 110 may use the length of the major axis of a MacAdam ellipse in the a*b* plane as the size index. In general, a variety of values related to the size of MacAdam ellipses may be used as the size index. In any case, the size index is a chroma index related to the chroma of the second reference color specification values since chroma increases as the size of a MacAdam ellipse increases.

Assume that a grid value corresponding to a second reference color specification value representing a first color and a grid value corresponding to a second reference color specification value representing a second color both belong to a uniform color range (predetermined from at least one of the uniform hue range HR1 (see FIG. 3B) and the uniform hue range HR (see FIG. 3D), for example) in any of the above cases. Here, when a size specified by the first size index of the MacAdam ellipse for the first color is greater than a size specified by the second size index of the MacAdam ellipse for the second color, the reduction rate for the consumption of colorant resulting from modifying second reference color specification values having the first size index is preferably greater than the reduction rate for the consumption of colorant resulting from modifying second reference color specification values having the second size index. This configuration can reduce the consumption of colorant while suppressing an unnatural appearance of printed colors.

(6) The ratio Rt of the total consumption Ct in FIGS. 7 and 12 and the ratio Rr of the residual amount Cr in FIGS. 8 and 13 are both examples of a colorant amount index related to the amount of colorant. In general, any of various values related to at least one of the total consumption Ct and residual amount Cr may be used as the colorant amount index. A variety of conditions expressed using this colorant amount index may be used as a reduction condition specifying whether the consumption of colorant is to be reduced in place of the conditions "Rt1<Rt" (FIGS. 7 and 12) and "Rr<Rr3" (FIGS. 8 and 13). In either case, when the colorant amount index satisfies the reduction condition, the processor 110 preferably performs the color conversion process using a reduction look-up table LUTz that is configured to reduce the consumption amount of colorant corresponding to the color component of this colorant amount index.

In any case, the processor 110 may execute a color conversion process using a reduction look-up table LUTz generated by modifying gradation values of a specific color component for Q number of second reference color specification values. Here, at least some of the Q number of modified second gradation values is used in the color conversion of the specific color component. Further, at least some of the (L−Q) number of color correspondences represented by (L−Q) number of second reference color specification values that were not modified is used in the color conversion of the other color components.

(7) Various other processes for modifying the second reference color specification values using a reduction rate (the reduction rate Rc in FIG. 10, the reduction rate Rci in FIG. 14, or the reduction rate Rci in FIG. 15, for example) may be used in place of the processes in S136b of FIG. 10, S178 of FIG. 14, and S178e of FIG. 15. For example, the processor 110 may convert the second reference color specification values to CIELAB color specification values and may modify the CIELAB color specification values by multiplying each of the a* value and b* value by (100%−reduction rate Rc). Next, the processor 110 may identify modified CMYK color specification values from the modified CIELAB color specification values. Here, the processor 110 may identify the modified CMYK color specification values by referencing predetermined correspondences between CIELAB color specification values and CMYK color specification values.

Alternatively, the processor 110 may modify color specification values without calculating the reduction rate. For example, a color region in the CIELAB color space containing colors that the human eye cannot differentiate from the color represented by the second reference color specification values is represented as a solid region (hereinafter called a "uniform color region"). The region obtained by projecting this uniform color region onto the a*b* plane is a MacAdam ellipse E described with reference to FIG. 10 and the like. The processor 110 may identify target L*a*b* values in this uniform color region that include an L* greater than the L* of the second reference color specification value, an a* smaller than the a* of the second reference color specification value, and a b* smaller than the b* of the second reference color specification value. The second color specification values corresponding to the target L*a*b* values (the CMYK color specification values in this case) may be used as the modified color specification values. Note that a uniform color region may be identified by referencing preset correspondences between the second reference color specification values and uniform color regions. Further, various methods may be employed to identify target L*a*b* values. For example, the target L* value may be the mean of the L* of the second reference color specification values and the lightest L* in the uniform color region. Next, a*b* values closest to the point of origin O of the a*b* plane in the portion of the uniform color region having the target L* value, i.e., a portion parallel to the a*b* plane, may be used as the target a*b* values.

In any case, the total number of second reference color specification values to be modified may be an arbitrary number Q no greater than the total number L of color correspondences (where Q is an integer equal to or more than one and equal to or less than L). For example, second reference color specification values associated with L* values that are darker than a threshold may be targeted for modification. This threshold may be preset or may be specified by the user.

(8) In the process of FIG. 9, the number of levels that a user can specify may be any number of two or greater and is not limited to three. For example, a user may specify one of ten different levels. Here, the processor 110 may calculate color specification values at the user-specified level by interpolating color specification values in a plurality of reduction look-up tables LUTz having different reduction amounts.

(9) The processor 110 may implement a first process mode for automatically selecting a reduction look-up table LUTz without user input, as in FIGS. 7, 8, 12, and 13, and a second process mode for selecting a reduction look-up table LUTz according to the user-specified level, as in FIG. 9. Next, the processor 110 may generate print data according to a process mode selected by the user from among a plurality of modes that include the first process mode and second process mode. However, the processor 110 may execute only one of the first and second process modes.

(10) Various other procedures may be used for the printing process in place of the procedure in FIG. 6. For example, the processor 110 may perform a calibration process for calibrating the CMYK gradation values separate from the color conversion process using color correspondence information (look-up tables, for example). The calibration process adjusts the gradation values for each color component so that color densities printed on paper change linearly in response to changes in gradation values for each of the CMYK colors. The processor 110 executes the calibration process using calibration tables prepared for each of the CMYK color components, for example. The calibration tables are one-dimensional look-up tables associating pre-calibrated gradation values to post-calibrated gradation values. This calibration process is performed between the color conversion process and the halftone process, for example.

(11) The first and second color spaces correlated in the color correspondence information (look-up tables, for example) may be various color spaces. For example, the first color space may be the YCbCr color space. Further, the second color space may be the CIELAB color space. However, the second color space is preferably a color space represented by a plurality of color components corresponding to the plurality of colorants employed by the printer 210. Such an arrangement enables the consumption of colorants to be adjusted more easily by modifying the color correspondence information.

(12) The colorants used by the printer 210 are of an arbitrary type and number and are not limited to the four colors cyan C, magenta M, yellow Y, and black K. For example, colorants of the three colors cyan C, magenta M, and yellow Y may be employed.

(13) The structure of the generating device that generates color correspondence information may differ from the structure of the data-processing apparatus 100 described in FIG. 1. Further, the structure of the device that generates print data may differ from the structure of the data-processing apparatus 100 described in FIG. 1. For example, a device separate from the generating device that generates color correspondence information may be used for generating print data. Further, at least one of the devices for generating color correspondence information and for generating print data may be configured of a dedicated hardware circuit, such as an application-specific integrated circuit (ASIC). Further, a multifunction peripheral comprising the data-processing apparatus 100, colorimeter 200, and printer 210 may execute at least one of the processes for generating color correspondence information and for generating print data. Further, a plurality of devices that can communicate over a network (computers, for example) may each implement some of the functions for generating color correspondence information so that the devices as a whole can provide the functions required for generating color correspondence information. (Here, the system comprising the devices corresponds to the generating device for generating color correspondence information.) Similarly, a plurality of devices may each implement some of the functions for generating print data so that the devices as a whole can provide the functions required for generating print data. (Here, the system comprising the devices corresponds to the generating device for generating print data.)

In the embodiments described above, part of the configuration implemented in hardware may be replaced with software and, conversely, all or part of the configuration implemented in software may be replaced with hardware. For example, a dedicated hardware circuit may be provided to execute the function of S170 in FIG. 2.

When all or some of the functions of the present disclosure are implemented with computer programs, the programs can be stored on a non-transitory computer-readable storage medium (a non-temporary storage medium, for example). The programs may be used on the same storage medium on which they were supplied or may be transferred to a different storage medium (non-transitory computer-readable storage medium). The "non-transitory computer-readable storage medium" may be a portable storage medium, such as a memory card or CD-ROM; an internal storage device built into the computer, such as any of various ROM or the like; or an external storage device, such as a hard disk drive, connected to the computer.

While the description has been made in detail with reference to specific embodiments and variations, it would be apparent to those skilled in the art that various changes and modifications may be made thereto.

What is claimed is:

1. A method for generating color correspondence information correlating a plurality of first color specification values in a first color space with a plurality of second color specification values in a second color space on a one-to-one basis, the color correspondence information being for printing using a plurality of types of colorants, the method comprising:

acquiring reference color correspondence information correlating L number of first reference color specification values in the first color space with L number of second reference color specification values in the second color space on a one-to-one basis, each of the L number of first reference color specification values including a plurality of first reference color components, each of the L number of second reference color specification values including a plurality of second reference color components, the plurality of second reference color components corresponding to respective ones of the plurality of types of colorants, where L is an integer greater than or equal to two;

executing a first modification process to modify Q number of second reference color specification values among the L number of second reference color specification values to obtain Q number of modified second reference color specification values so as to reduce a consumption amount of at least one of the plurality of types of colorants consumed in printing, where Q is an integer greater than or equal to one and smaller than or equal to L;

identifying a color difference index indicating color difference between each of the Q number of second reference color specification values and corresponding one of the Q number of second modified reference color specification values;

executing a second modification process to remodify N number of modified second reference color specification values among the Q number of modified second reference color specification values to obtain N number of remodified second reference color specification values so that a color difference index indicating color difference between each of N number of second reference color specification values and corresponding one of the N number of remodified second reference color specification values approaches a target color difference index, where N is an integer greater than or equal to one and smaller than or equal to Q; and generating color correspondence information correlating the L number of first reference color specification values with L number of determined second color specification values on a one-to-one basis, the L number of determined second color specification values including (L–Q) number of second reference color specification values which are not modified in the first modification process nor in the second modification process, (Q–N) number of modified second reference color specification values which are modified in the first modification process but not in the second modification process, and the N number of remodified second reference color specification values which are modified in both the first modification process and the second modification process.

2. The method according to claim 1, wherein the plurality of types of colorants includes a first colorant and a second colorant, wherein when the Q number of second reference color specification values are modified so as to reduce a consumption amount of the first colorant most among the plurality of types of colorants in the first modification process, the generating generates first color correspondence information, wherein when the Q number of second reference color specification values are modified so as to reduce a consumption amount of the second colorant most among the plurality of types of colorants in the first modification process, the generating generates second color correspondence information, wherein the first color correspondence information is used for printing a first target image when a consumption amount of the first colorant is largest among the plurality of types of colorants consumed in printing the first target image using the reference color correspondence information, and wherein the second color correspondence information is used for printing a second target image when a consumption amount of the second colorant is largest among the plurality of types of colorants consumed in printing the second target image using the reference color correspondence information.

3. The method according to claim 1, wherein the plurality of types of colorants includes a first colorant and a second colorant, wherein when the Q number of second reference color specification values are modified so as to reduce a consumption amount of the first colorant most among the plurality of types of colorants in the first modification process, the generating generates first color correspondence information, wherein when the Q number of second reference color specification values are modified so as to reduce a consumption amount of the second colorant most among the plurality of types of colorants in the first modification process, the generating generates second color correspondence information, wherein the first color correspondence information is used when a residual amount of the first colorant is least among the plurality of types of colorants in a printer, and wherein the second color correspondence information is used when a residual amount of the second colorant is least among the plurality of types of colorants in a printer.

4. The method according to claim 1, wherein the plurality of types of colorants includes a first colorant, wherein when the Q number of second reference color specification values are modified so as to reduce a consumption amount of the first colorant by a first amount and most among the plurality of types of colorants in the first modification process, the generating generates first color correspondence information, and wherein when the Q number of second reference color specification values are modified so as to reduce a consumption amount of the first colorant by a second amount different from the first amount and most among the plurality of types of colorants in the first modification process, the generating generates second color correspondence information.

5. The method according to claim 1, further comprising:

acquiring a user specification for a reduction level indicating a level of the reduction amount; and generating print data using the color correspondence information, wherein the generating color correspondence information generates a plurality of color correspondence information, each of the plurality of color correspondence information being for reducing a consumption amount of a specific type of colorant consumed in printing by a reduction amount, the reduction amount for one of the plurality of color correspondence information being different from that for another of the plurality of color correspondence information, and wherein the generating print data specifies specific color correspondence information among the plurality of color correspondence information in accordance with the reduction level and generates the print data using the specific color correspondence information.

6. The method according to claim 1, further comprising:

identifying a colorant amount index indicating an amount of each of the plurality of types of colorants;

identifying a specific type of colorant from the plurality of types of colorants, the colorant amount index satisfying a predetermined condition; and generating print data using the color correspondence information, wherein the generating color correspondence information generates a plurality of color correspondence information corresponding to respective ones of the plurality of types of colorants, each of the plurality of color correspondence information being for reducing a consumption amount of a corresponding one of the plurality of types of colorants consumed in printing, wherein the generating print data generates the print data using the color correspondence information corresponding to the specific type of colorant, and wherein in the generating print data, at least some of the (Q–N) number of modified second reference color specification values and the N number of remodified second reference color specification values of the color correspondence information are used for the specific type of colorant, and at least some of the (L–Q) number of second reference color specification values are used for the plurality of types of colorants other than the specific type of colorant.

* * * * *